(12) United States Patent
Connors

(10) Patent No.: US 10,227,048 B2
(45) Date of Patent: Mar. 12, 2019

(54) ADJUSTABLE LOAD SUPPORT

(71) Applicant: Thule Sweden AB, Hillerstorp (SE)

(72) Inventor: Daniel Connors, Southbury, CT (US)

(73) Assignee: Thule Sweden AB, Hillerstorp (SE)

( * ) Notice: Subject to any disclaimer, the term of this patent is extended or adjusted under 35 U.S.C. 154(b) by 39 days.

(21) Appl. No.: 14/811,381

(22) Filed: Jul. 28, 2015

(65) Prior Publication Data
US 2017/0028930 A1   Feb. 2, 2017

(51) Int. Cl.
*B60R 9/00* (2006.01)
*B60R 9/048* (2006.01)
*B60R 9/045* (2006.01)
*B60R 9/08* (2006.01)

(52) U.S. Cl.
CPC .............. *B60R 9/048* (2013.01); *B60R 9/045* (2013.01); *B60R 9/08* (2013.01)

(58) Field of Classification Search
CPC ............ B60R 9/08; B60R 9/045; B60R 9/048
USPC ....................................................... 224/321
See application file for complete search history.

(56) References Cited

U.S. PATENT DOCUMENTS

| | | | | |
|---|---|---|---|---|
| 5,344,032 A | * | 9/1994 | Ramsdell | A47B 81/005 211/64 |
| 5,516,017 A | * | 5/1996 | Arvidsson | B60R 9/08 224/309 |
| 5,775,557 A | * | 7/1998 | Arvidsson | B60R 9/08 224/309 |
| 5,951,231 A | * | 9/1999 | Allen | B60P 3/1008 193/35 A |
| 6,164,507 A | * | 12/2000 | Dean | B60R 9/08 224/319 |
| 6,561,396 B2 | * | 5/2003 | Ketterhagen | B60R 9/08 224/310 |
| 6,793,109 B2 | * | 9/2004 | Gates | A47B 81/005 211/64 |
| 6,868,998 B2 | * | 3/2005 | Dean | B60R 9/048 224/324 |
| 7,036,698 B2 | * | 5/2006 | Allen | B60R 9/08 224/280 |
| 7,131,561 B2 | | 11/2006 | Humes | |
| 7,337,934 B2 | * | 3/2008 | Alling | F16B 2/10 224/401 |
| 8,156,681 B2 | * | 4/2012 | Carnevali | A01K 97/10 43/21.2 |
| 8,556,146 B2 | * | 10/2013 | Sautter | B60R 9/048 224/325 |

(Continued)

*Primary Examiner* — Peter Helvey
(74) *Attorney, Agent, or Firm* — Sterne, Kessler, Goldstein & Fox P.L.L.C.

(57) ABSTRACT

A load support for a vehicle load bar can include a base, a first arm coupled to the base and rotatable about a pivot axis, and a second arm coupled to the base and rotatable about the pivot axis. The first arm and the second arm can be configured to selectively move relative to each other. A locking device coupled with the first arm can be configured to selectively fix a position of the first arm and the second arm relative to each other in a locked configuration. The locking device can be configured to engage a notch in the second arm to prevent movement of the first arm and the second arm relative to each other and configured to disengage from the notch to allow movement of the first arm and the second arm relative to each other and separately about the pivot axis.

31 Claims, 25 Drawing Sheets

(56) References Cited

U.S. PATENT DOCUMENTS

| | | | | |
|---|---|---|---|---|
| 8,616,505 | B2 * | 12/2013 | Gates | F16M 13/02 |
| | | | | 211/124 |
| 8,745,913 | B2 * | 6/2014 | Hicks | F41A 23/18 |
| | | | | 42/94 |
| 9,067,522 | B2 * | 6/2015 | Laverack | B60R 9/045 |
| 9,333,922 | B2 * | 5/2016 | Laverack | B60R 9/045 |
| 9,381,866 | B2 * | 7/2016 | Sautter | B60R 9/045 |
| 2002/0125282 | A1 * | 9/2002 | Laverack | B60R 9/045 |
| | | | | 224/319 |
| 2009/0120982 | A1 * | 5/2009 | Sautter | B60R 9/08 |
| | | | | 224/323 |
| 2011/0163142 | A1 * | 7/2011 | Farber | B60R 9/08 |
| | | | | 224/545 |
| 2014/0144959 | A1 * | 5/2014 | Sautter | B60R 9/045 |
| | | | | 224/321 |
| 2017/0028929 | A1 * | 2/2017 | Connors | B60R 9/048 |
| 2017/0028930 | A1 * | 2/2017 | Connors | B60R 9/048 |

* cited by examiner

ADJUSTABLE LOAD SUPPORT

BACKGROUND

Field

Embodiments of the present invention relate to support pads and adjustable supports for carrying a load, for example, a watercraft, on a vehicle. More specifically, embodiments of the present invention relate to and to adjustable supports having arms rotatable relative to a base and each other.

Background

Saddles and supports for carrying watercraft, for example, kayaks, canoes, jet skis, boats, surfboards, standup paddle boards, etc. are useful when carrying such equipment on a vehicle. Such supports can be attached to load bars on the roof of a vehicle in order to carry the watercraft on the roof of the vehicle. In order to protect the structural integrity of the equipment being carried, it is important to have sufficient contact between the equipment and the support structure.

BRIEF SUMMARY

In certain embodiments, a load support for a vehicle load bar can include a base, a first arm coupled to the base and rotatable about a pivot axis, and a second arm coupled to the base and rotatable about the pivot axis. The first arm and the second arm can be configured to selectively move relative to each other. In certain embodiments, a length of the first arm can be longer than a length of the second arm. In certain embodiments, a fastener can couple the base, the first arm, and the second arm along the pivot axis. In certain embodiments, the base can have a first upright and a second upright and the pivot axis can extend perpendicularly through the first and second uprights. In certain embodiments, a proximal end of the first arm can be disposed exterior to a proximal end of the second arm and the proximal end of the first arm can be disposed interior to the first and second uprights.

In certain embodiments, the load support can include a locking device coupled with the first arm configured to selectively fix a position of the first arm and the second arm relative to each other in a locked configuration. In certain embodiments, the first arm and the second arm can rotate simultaneously about the pivot axis in the locked configuration. In certain embodiments, the first and second arms can be configured to lock in a plurality of positions relative to each other. In certain embodiments, the locking device can be configured to engage a notch in the second arm to prevent movement of the first arm and the second arm relative to each other. In certain embodiments, the locking device can be configured to disengage from the notch to allow movement of the first arm and the second arm relative to each other and separately about the pivot axis. In certain embodiments, the locking device can include a spring biasing the locking device into the locked configuration.

In certain embodiments, the second arm can have a plurality of notches and the first arm can be disposed at a first angle relative to the second arm when the locking device is disposed in a first notch and the first arm can be disposed at a second angle relative to the second arm when the locking device is disposed in a second notch. In certain embodiments, the second arm can have a third notch and a fourth notch such that when the locking device is disposed in the first notch, the second notch, the third notch, and the fourth notch, an angle between the first arm and the second arm is approximately 180 degrees, 160 degrees, 140 degrees, and 120 degrees, respectively.

In certain embodiments, the base can include a first stopping surface configured to limit rotation of the first arm in a first direction. In certain embodiments, an angle between the first arm and the first stopping surface can be approximately 90 degrees when the first arm contacts the first stopping surface. In certain embodiments, the base can include a second stopping surface configured to limit rotation of the second arm in a second direction. In certain embodiments, an angle between the second arm and the second stopping surface can be approximately 45 degrees when the second arm contacts the second stopping surface.

In certain embodiments, the load support can include a pad coupled to the first arm and the second arm. The pad can be configured to receive a load disposed on the load support.

In certain embodiments, an assembly for supporting a load on a vehicle load bar can include a base configured to couple to the load bar, a pair of arms coupled to the base by a fastener disposed along a pivot axis such that the arms are configured to rotate about the pivot axis, and a locking device configured to prevent movement of the arms relative to each other in a locked configuration and configured to allow movement of the arms relative to each other in an unlocked configuration. In certain embodiments, the assembly can include a slide lock disposed in a first arm. The slide lock can have a plate configured to engage a notch in a second arm to prevent movement of the first arm and the second arm relative to each other. In certain embodiments, the slide lock can be configured to disengage from the notch to allow movement of the first arm and the second arm relative to each other.

In certain embodiments, the second arm can have a plurality of notches and the first arm can be disposed at a first angle relative to the second arm when the slide lock is disposed in a first notch and the first arm can be disposed at a second angle relative to the second arm when the slide lock is disposed in a second notch. In certain embodiments, the second arm can have a third notch and a fourth notch such that when the slide lock is disposed in the first notch, the second notch, the third notch, and the fourth notch, an angle between the first arm and the second arm is approximately 180 degrees, 150 degrees, 120 degrees, and 90 degrees, respectively.

In certain embodiments, a support for reducing pressure imparted to a load carried on a vehicle can include a base and two independent arms coupled to the base at the same pivot axis such that the arms are configured to rotate about the pivot axis and are movable relative to each other from a first locked position to a second locked position. In certain embodiments, an angle between the arms can be smaller in the second position than in the first position. In certain embodiments, the support can have a pad coupled to the arms and a locking device configured to lock the arms in the first locked position and the second locked position and configured to disengage to allow the arms to move from the first locked position to the second locked position.

BRIEF DESCRIPTION OF THE DRAWINGS

The accompanying drawings are incorporated herein and form part of the specification, illustrate the embodiments, and together with the description, further serve to explain the principles of the embodiments and to enable a person skilled in the relevant art(s) to make and use the embodiments.

Figure 1:
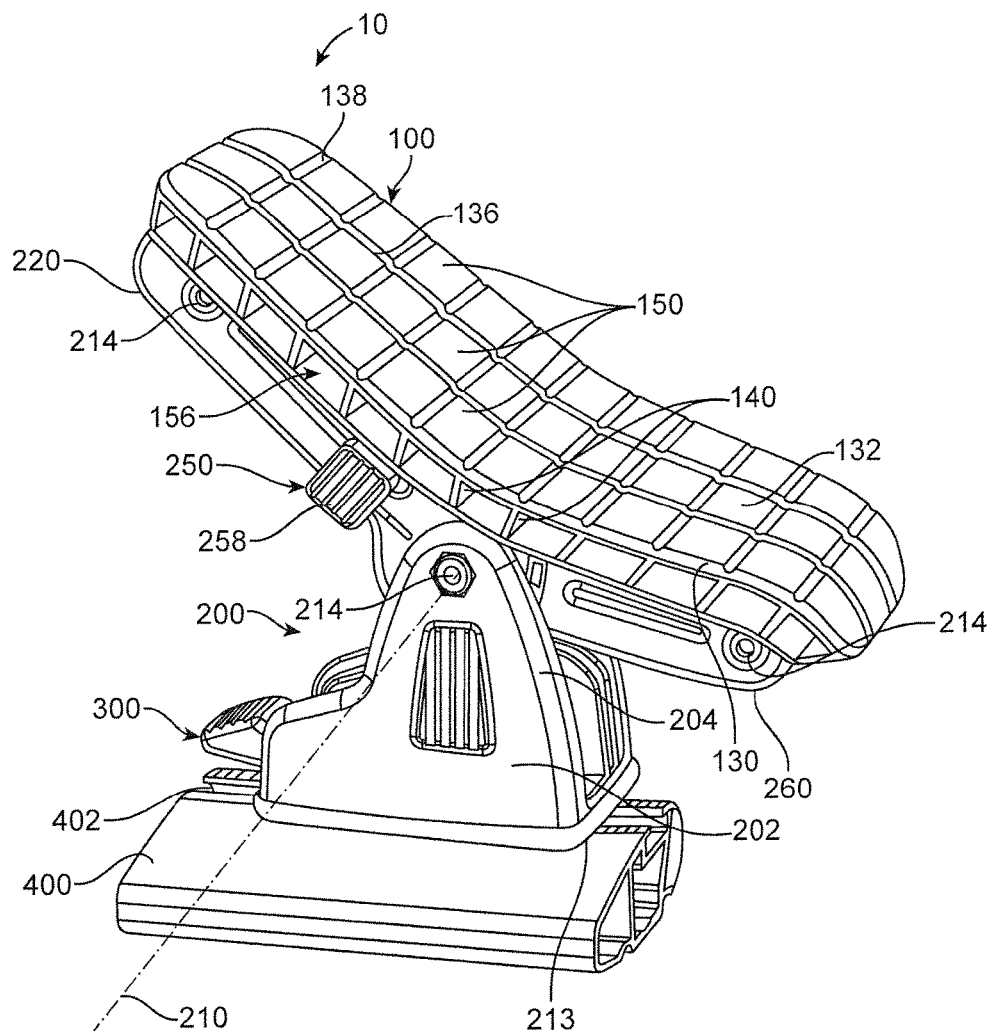
FIG. 1 illustrates a perspective view of an adjustable support attached to a load bar according to an embodiment.

The features and advantages of the embodiments will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

The present invention will now be described in detail with reference to embodiments thereof as illustrated in the accompanying drawings. References to "one embodiment," "an embodiment," "some embodiments," "certain embodiments," etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The term "invention" or "present invention" as used herein is a non-limiting term and is not intended to refer to any single embodiment of the particular invention but encompasses all possible embodiments as described in the application.

Although the terms "watercraft" and "recreational equipment" are often used herein to refer to the loads carried on the support pads and adjustable supports described herein, these terms are not meant to be limiting. The disclosed devices can carry other loads and types of equipment.

Transporting recreational equipment can be a difficult task. While equipment can simply be strapped to a roof or load bars on a vehicle with ropes or bungees, recreational equipment, for example, kayaks, canoes, jet skis, boats, surfboards, standup paddle boards, etc. is often expensive and so it is desirable to protect the equipment from forces exerted on it while being carried on the vehicle. In order to protect the structural integrity of the equipment being carried, it is important to have sufficient contact between the equipment and the support structure. Without proper support, "hot spots" of pressure can be exerted on the equipment in localized areas. These hot spots can cause damage to the equipment, for example, scratches or cracks that can affect the performance and structural integrity of the equipment. In order to protect the equipment during transport, it is important to have sufficient contact between the watercraft and the support structure(s). This can be difficult, for example, due to the curved nature of watercraft hulls and the differences between hulls of various watercraft. The support pads and adjustable supports disclosed herein can adapt to the various curvatures of different watercraft hulls and other recreational equipment, thereby providing better contact and support. This reduces hot spots and provides better protection for the equipment being transported.

Features of the support pads and adjustable supports disclosed herein improve the contact and support between the adjustable support and the equipment being transported. For example, the support pads provide three-dimensional movement to conform to the equipment being transported. That is, the pads can be compressed while also being able to move in longitudinal and lateral directions at the same time. In certain embodiments, this can be achieved by having the pad subdivided into a number of independent cells. Each cell can move independently of other cells, thereby allowing the pad to support equipment of many shapes and contours. In certain embodiments, cells can be hollow to allow for sufficient compression of the cell to support the equipment.

In certain embodiments, ribs between a base layer and contact layer of the pad can provide additional stability while at the same time being able to bend in multiple directions to allow the pad to conform to the equipment. The ribs can be disposed at particular angles and directions to provide both stability and flexibility of the pads. Channels and grooves in the pads can provide additional grip and also allow the cells to more freely move in multiple directions to accommodate the equipment. The channels can define columns of cells, where each column can move independently of the other columns.

The support pads can be disposed on arms of the adjustable support. The arms can provide additional benefits for supporting the equipment being transported. For example, the arms can rotate independently with respect to a base and also with respect to each. In a locked configuration, the arms can be fixed relative to each other and can rotate simultaneously with respect to a base. This can allow the adjustable support to be disposed in many positions in order to support the equipment. In an unlocked configuration, the arms can rotate relative to each other and relative to the base. The arms can therefore be moved from one locked position to another locked position, allowing the arms to be disposed at different angles relative to each other. For example, in certain embodiments, the arms can be disposed at approximately 180 degrees relative to each other so that the adjustable support and pad are flat. The arms can be unlocked and moved to another locked position so that they are disposed approximately at, for example, 160 degrees, 120 degrees, or 90 degrees with respect to each other. This allows the arms to better receive and support various shapes of equipment surfaces.

Separately, the features of the support pads and the adjustable supports can provide significant advantages for carrying and transporting recreational equipment. Together, they provide a broad spectrum of customized support and cushioning for equipment transport. These and other features of the support pads and adjustable supports disclosed herein are described in more detail below with respect to the Figures.

FIG. 1 illustrates adjustable support 10, according to an embodiment. As shown in FIG. 1, adjustable support 10 can be coupled to a load bar 400, which in turn can be coupled to the roof of a vehicle. In certain load carrying systems, one two, three, four, or more adjustable supports 10 can be used to transport equipment on the roof of a vehicle. For example, when transporting a kayak, two adjustable supports can support a proximal end of the hull and two adjustable supports can support a distal end of the hull.

Adjustable support 10 can include support pad 100 and load support 200. In certain embodiments, a base 202 of load support 200 can be coupled to a slot 402 in load bar 400. Base 202 can be moved and secured within slot 402 to selectively vary the distance between adjacent adjustable supports 10 mounted on load bar 400 in order to accommodate a width of the equipment being transported. In certain embodiments, a first arm 220 and second arm 260 can be coupled with base 202, for example, by a fastener 214. As referred to herein, the term "fastener" includes but is not limited to bolts, screws, rivets, clips, etc. that are configured to secure elements together. In certain embodiments, first arm 220 and second arm 260 can be coupled to base 202 along a pivot axis 210. As such, first arm 220 and second arm 260 can independently rotate about pivot axis 210 with respect to base 202, which can remain fixed to load bar 400.

In certain embodiments, a base layer 110 of support pad 100 can be coupled with first arm 220 and second arm 260. In certain embodiments, support pad 100 can include a contact layer 130 and a plurality of ribs 140 defining hollow spaces 156 within support pad 100. In certain embodiments, support pad 100 can have one or more channels 136 in contact layer 130 extending along the length of support pad 100. In certain embodiments, support pad 100 can have one or more grooves 138 extending across a width of support pad 100. These and other features will be described in more detail below with respect to the Figures.

Figure 2:
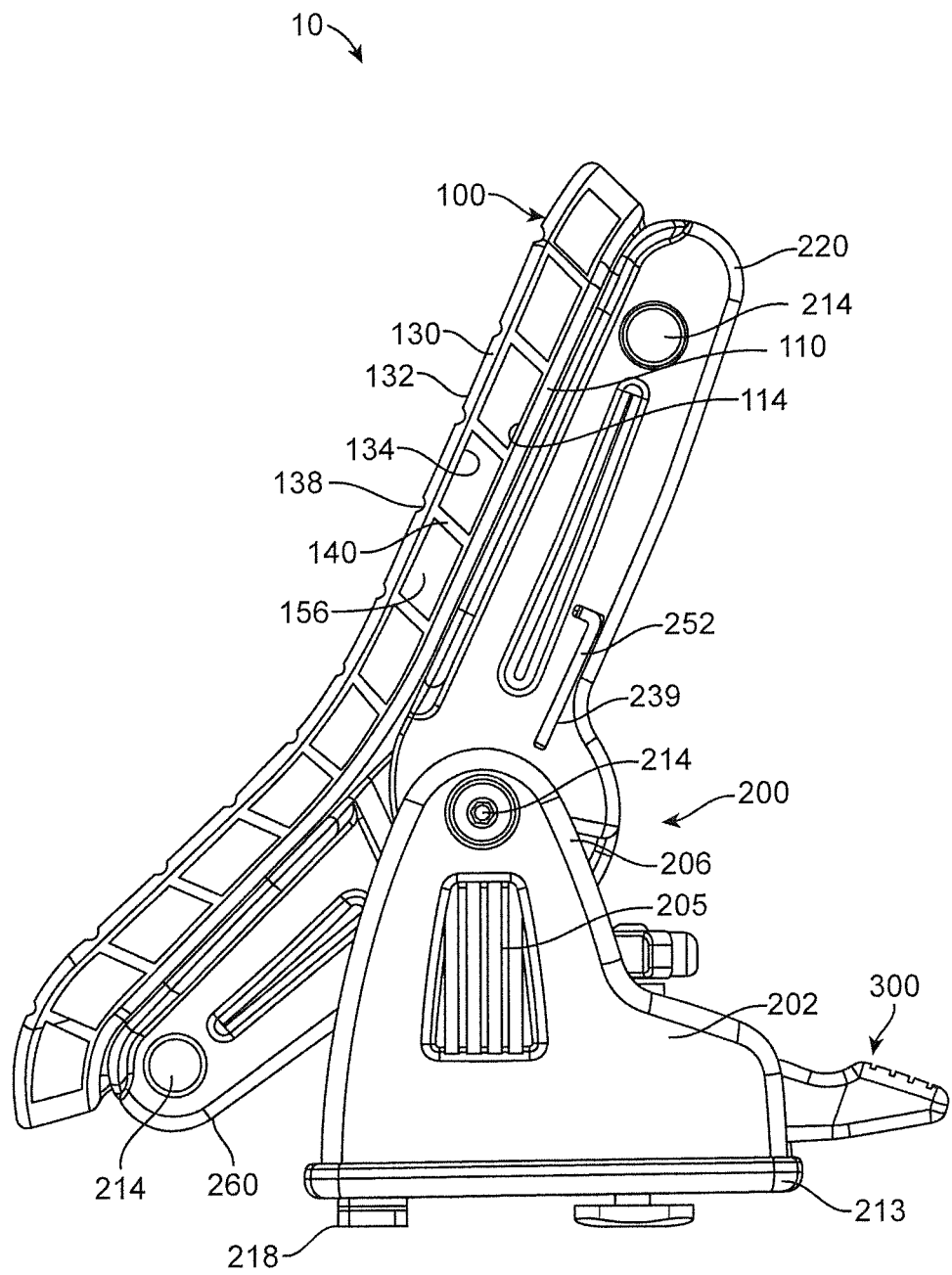
FIG. 2 illustrates a side view of an adjustable support according to an embodiment.

FIG. 2 illustrates a side view of adjustable support 10, according to an embodiment. In certain embodiments, support pad 100 of adjustable support 10 can include base layer 110 and contact layer 130. In certain embodiments, the plurality of ribs 140 can extend between an interior surface 114 of base layer 110 and an interior surface 134 of contact layer 130. Contact layer 130 includes contact surface 132, which can contact the equipment being transported, for example, the hull of a watercraft. As shown in FIG. 2, the ribs 140 between base layer 110 and contact layer 130 can define a plurality of hollow spaces 156 through support pad 100. Grooves 138 in contact surface 132 of contact layer 130 can provide additional flexibility to support pad 100 while also improving grip.

In certain embodiments, support pad 100 can be coupled with a first arm 220 and a second arm 260 of load support 200. For example, fasteners 214 can couple support pad 100 with first arm 220 and second arm 260. In certain embodiments, a fastener 214 can extend through base 202 of load support 200 and through first arm 220 and second arm 260 to couple the arms 220, 260 with the base 202. The side view of FIG. 2 also shows slot 239 in first arm 220 for plate 252 of slide lock 250 (see FIG. 11). Slot 239 provides an access point for button 258 to connect with plate 252 and allows plate 252 to slide, generally perpendicularly, within first arm 220.

In certain embodiments, base 202 can have a gripping surface 205, for example ribs or flanges, to facilitate gripping base 202 when installing it onto a load bar or adjusting base 202 when disposing equipment onto adjustable support 10. In certain embodiments, base 202 can have a pad 213 disposed on a bottom surface of base 202 to act as a cushion and provide additional friction to secure base 202 to the load bar. In certain embodiments, pad 213 can be formed, for example, from a thermoplastic elastomer (TPE). In certain embodiments, a foot or T-bolt 218 can extend from the bottom of base 202 to facilitate coupling base 202 into a slot of a load bar. In certain embodiments, load bar attachment device 300 can also facilitate coupling base 202 to a load bar.

Figure 3:
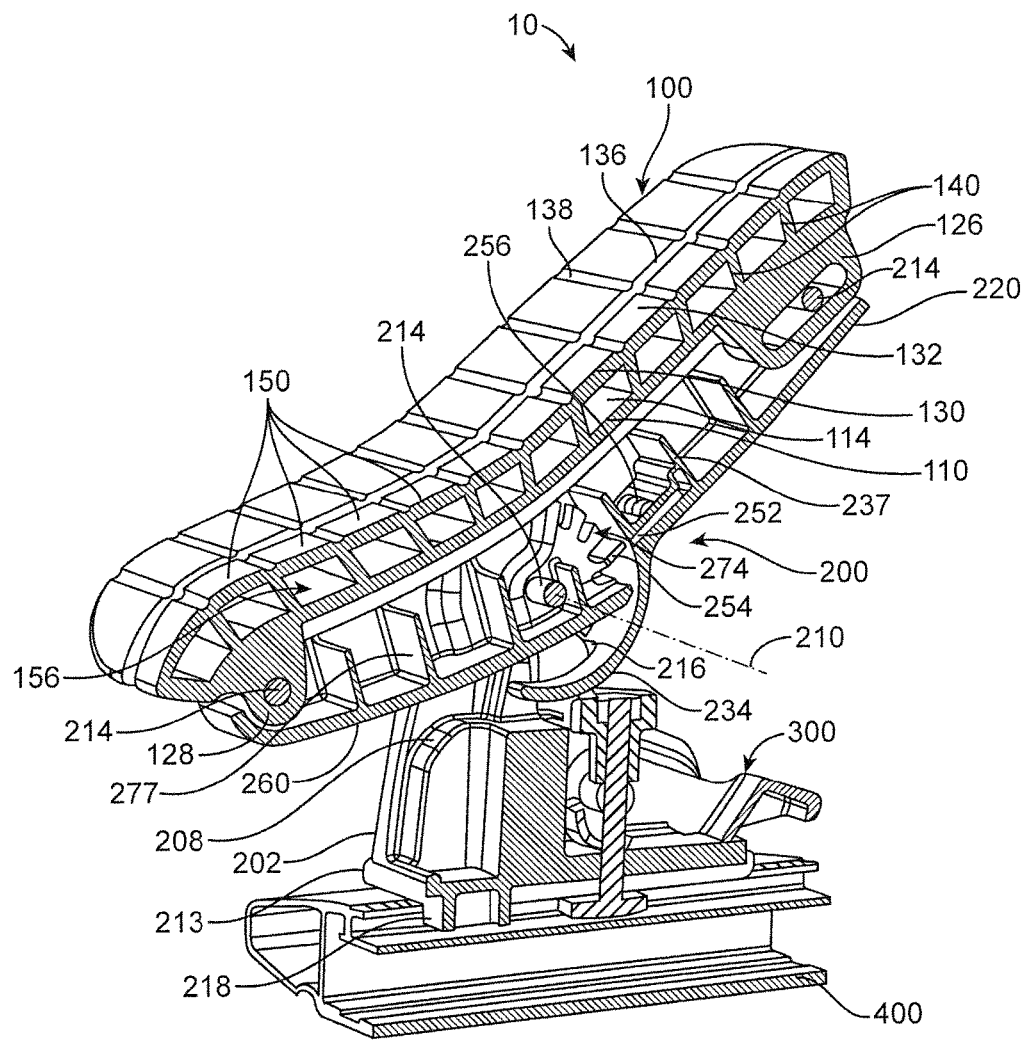
FIG. 3 illustrates a section view of an adjustable support attached to a load bar according to an embodiment.
Figure 22:
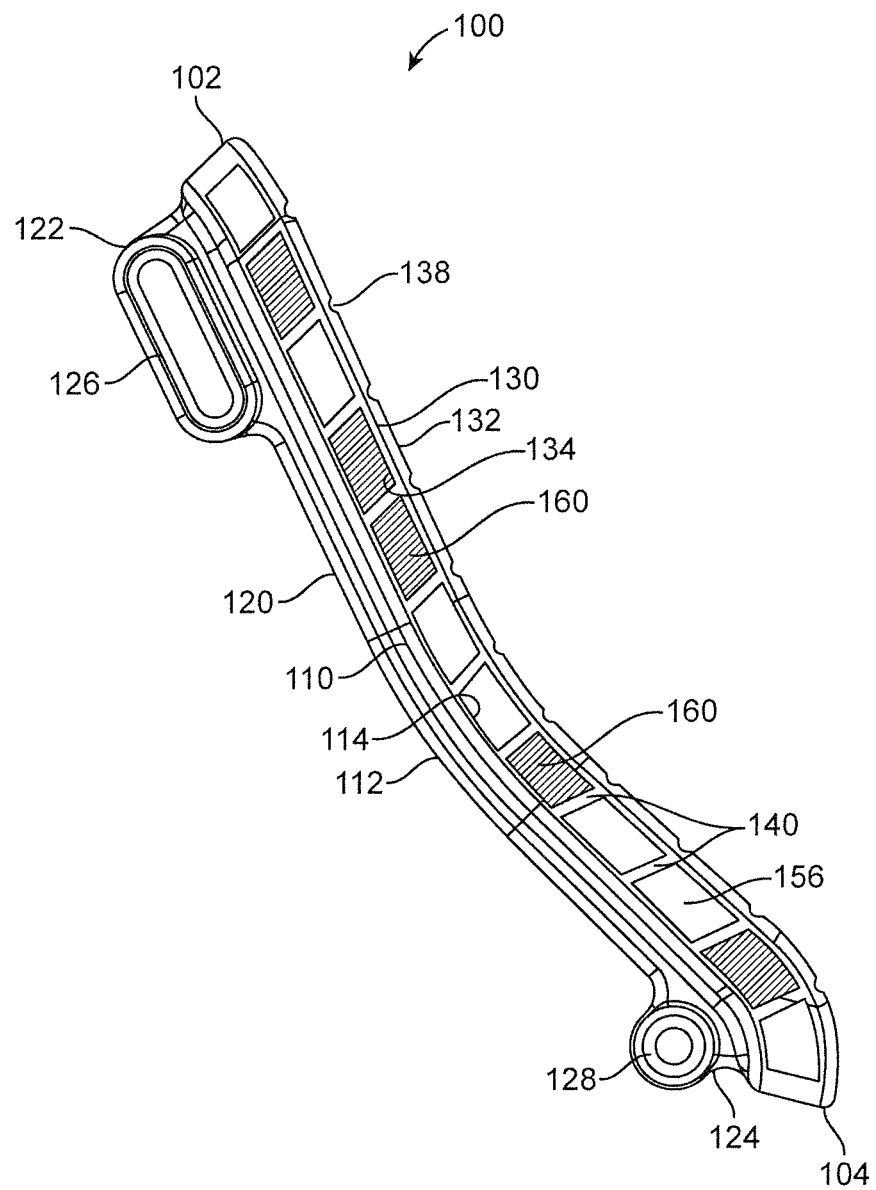
FIG. 22 illustrates a side view of a support pad having filling material according to an embodiment.

FIG. 3 illustrates a cross-section of adjustable support 10, according to an embodiment. As shown in FIG. 3, ribs 140, channels 136, and grooves 138 can divide support pad 100 into a plurality of cells 150. Hollow spaces 156 can extend through support pad 100 between adjacent ribs 140. In certain embodiments, for example, as shown in FIG. 22, a cell 150, some cells 150, or all of cells 150 and hollow spaces 156 can be filled with material 160, for example, rubber, plastic, foam, etc. The filler material 160 can fill individual cells 150 and/or extend entirely through a hollow space 156 of a row 154. The filler material 160 can limit the amount of compression and/or flexibility permitted by the cells 150. Specific patterns of filled and unfilled cells 150 can be implemented for customized compression and/or flexibility of support pad 100. For example, in one embodiment, one or more support pads 100 may include filled cells 150 to provide a less flexible pad, which may provide less "gripping," and thereby may be used to slide an end of the hull of a kayak, for example, during loading.

In certain embodiments, support pad 100 can be coupled with first arm 220 by a fastener 214 extending through first arm 220 and slotted attachment element 126 of support pad 100. In certain embodiments, support pad 100 can be coupled with second arm 260 by a fastener 214 extending through second arm 260 and tubular attachment element 128 of support pad 100. In certain embodiments, a fastener 214 disposed along pivot axis 210 can couple base 202 with first arm 220 and second arm 260. As such, all three components can be coupled along the same axis of rotation with a single fastener.

As also shown in FIG. 3, in certain embodiments, a plate 252 of a slide lock 250 can be disposed within the first arm 220. In certain embodiments, a tab 254 of plate 252 can engage a notch 274 of second arm 260 to fix the position of first arm 220 relative to second arm 260. Second arm 260 can have more than one notch 274, such that when plate 252 is disengaged, first arm 220 and second arm 260 can rotate about pivot axis 210 relative to each other. Once plate 252 reaches another notch 274, the arms 220, 260 can again be fixed relative to each other.

In certain embodiments, load bar attachment device 300 and T-bolt 218 of base 202 can facilitate coupling load support 200 with load bar 400. T-bolt 218 and a portion of load bar attachment device 300 can be disposed within a channel of load bar 400 to secure load support 200 to load bar 400. In certain embodiments, guard 234 on first arm 220 can protect first arm 220 from contacting portions of load bar attachment device 300 while rotating.

Figure 4:
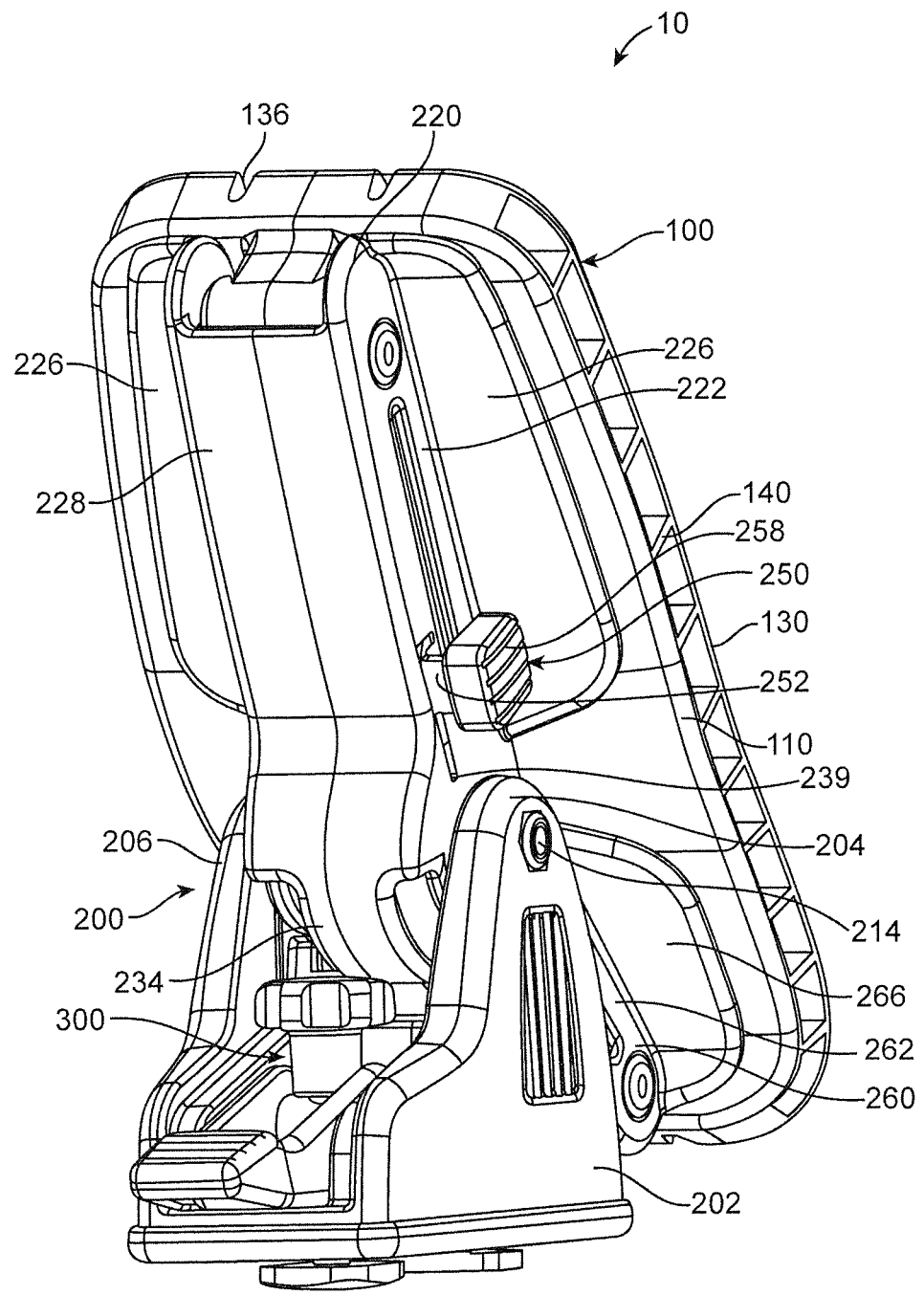
FIG. 4 illustrates a rear perspective view of an adjustable support according to an embodiment.

FIG. 4 illustrates a rear perspective view of adjustable support 10, according to an embodiment. As shown in FIG. 4, in certain embodiments, channels 136 can extend to an end of contact layer 130 of support pad 100. Ribs 140 can space base layer 110 from contact layer 130. Support pad 100 can be disposed on first arm 220 and second arm 260 of load support 200.

In certain embodiments, first arm 220 can have rear panel 228 and side panels 222. In certain embodiments, wings 226 can extend from side panel 222. In certain embodiments, wings 226 can be flat surfaces that provide additional surface area as a rigid backing for the support pad 100, which itself can be generally flexible. Wings 226 can be various shapes and sizes and extend across all or a portion of a width of support pad 100. Similarly, in certain embodiments, second arm 260 can have side panels 262 with wings 266 extending therefrom to receive support pad 100. Using wings 226, 266 rather than having the entirety of the arms 220, 260 extend as wide as wings 226, 266 can reduce the overall weight of load support 200.

In certain embodiments, base 202 of load support 200 can have a first upright 204 and a second upright 206 with an open space therebetween. First arm 220 and second arm 260 can be disposed in this space between first upright 204 and second upright 206 and coupled with the uprights 204, 206 by a fastener 214. The arms can therefore rotate about the fastener 214 while the uprights 204, 206 remain stationary.

In certain embodiments, a slide lock 250 can be disposed in first arm 220. As shown in FIG. 4 and described in more detail below with respect to FIG. 11, in certain embodiments, slide lock 250 can include a button 258 coupled with a plate 252 of slide lock 250. When button 258 is pressed, plate 252 can slide within slot 239 of first arm 220, thereby disengaging slide lock 250 so that the relative position of first arm 220 and second arm 260 can be adjusted with respect to each other.

Figure 5:
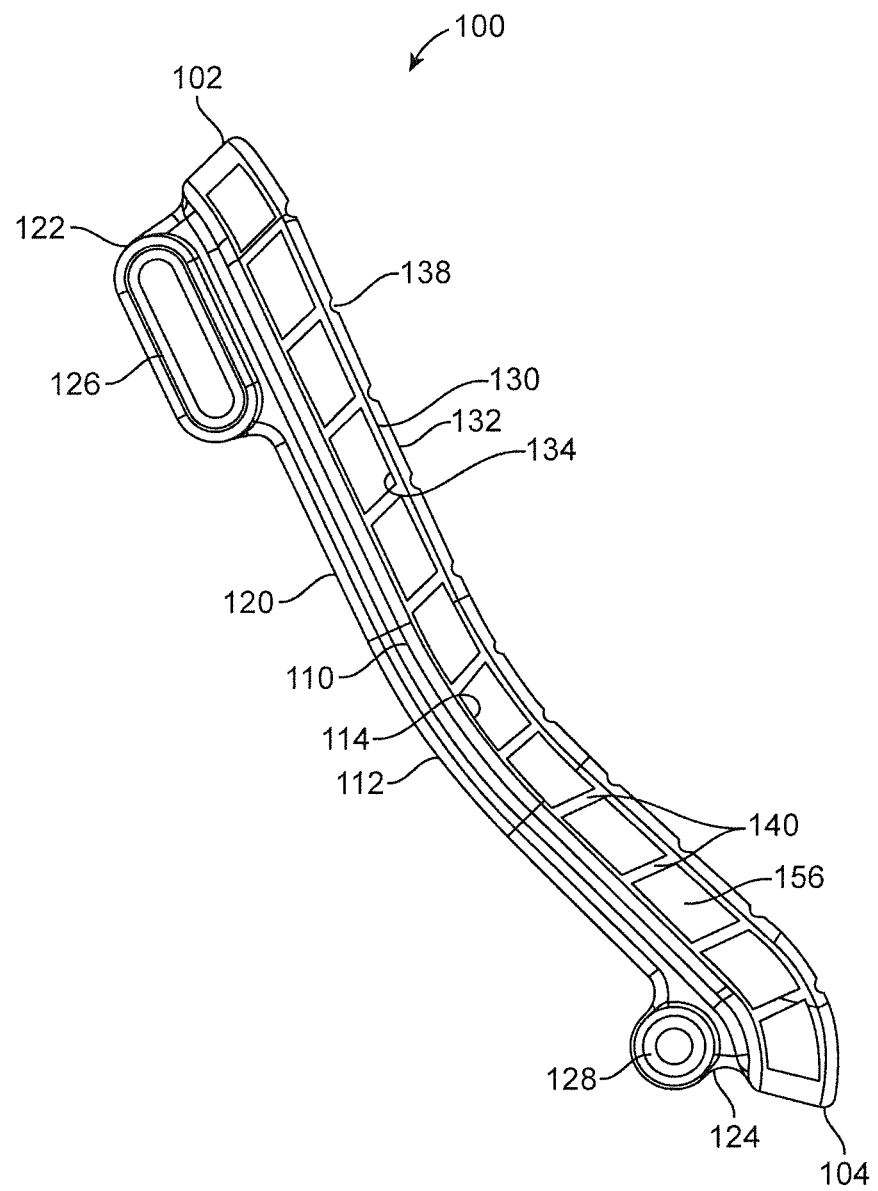
FIG. 5 illustrates a side view of a support pad according to an embodiment.
Figure 6:
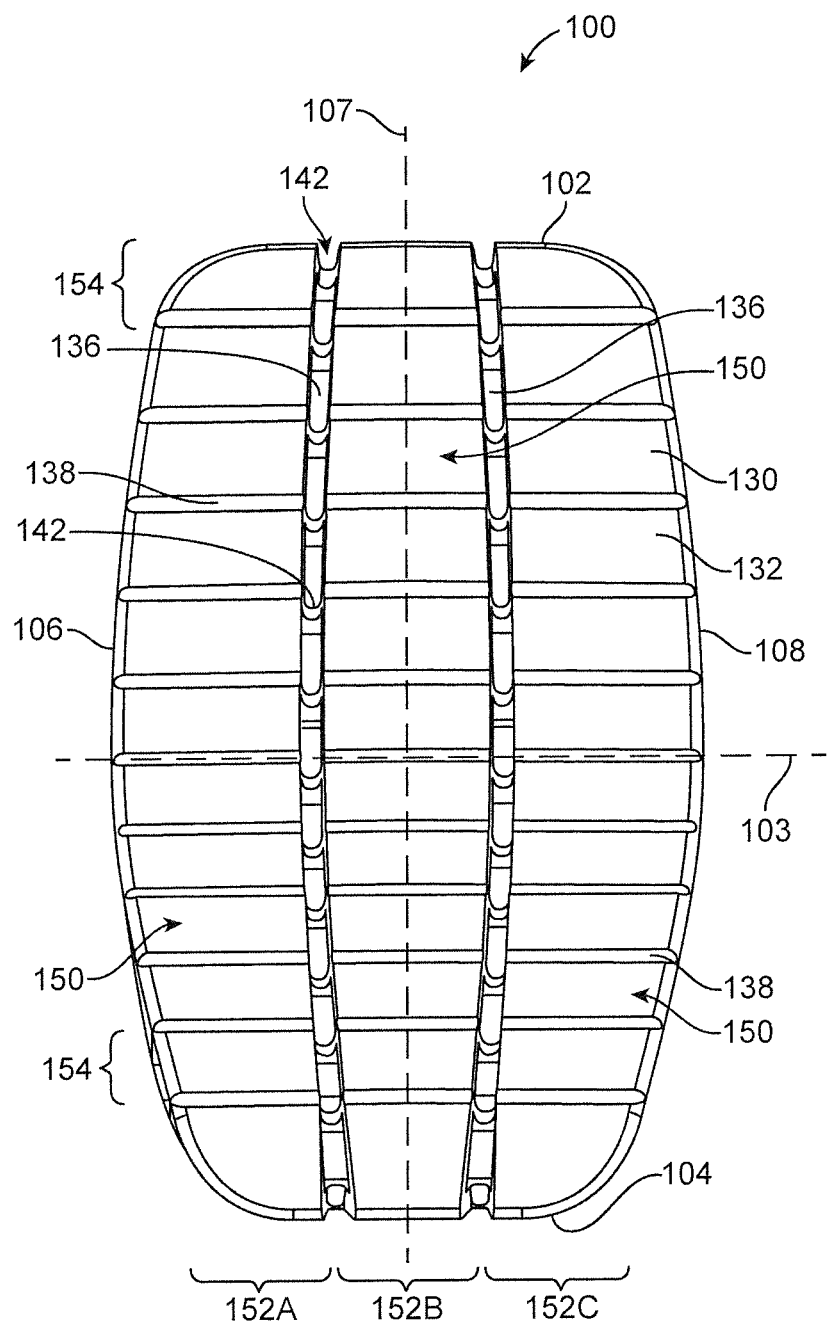
FIG. 6 illustrates a front perspective view of a support pad according to an embodiment.
Figure 7:
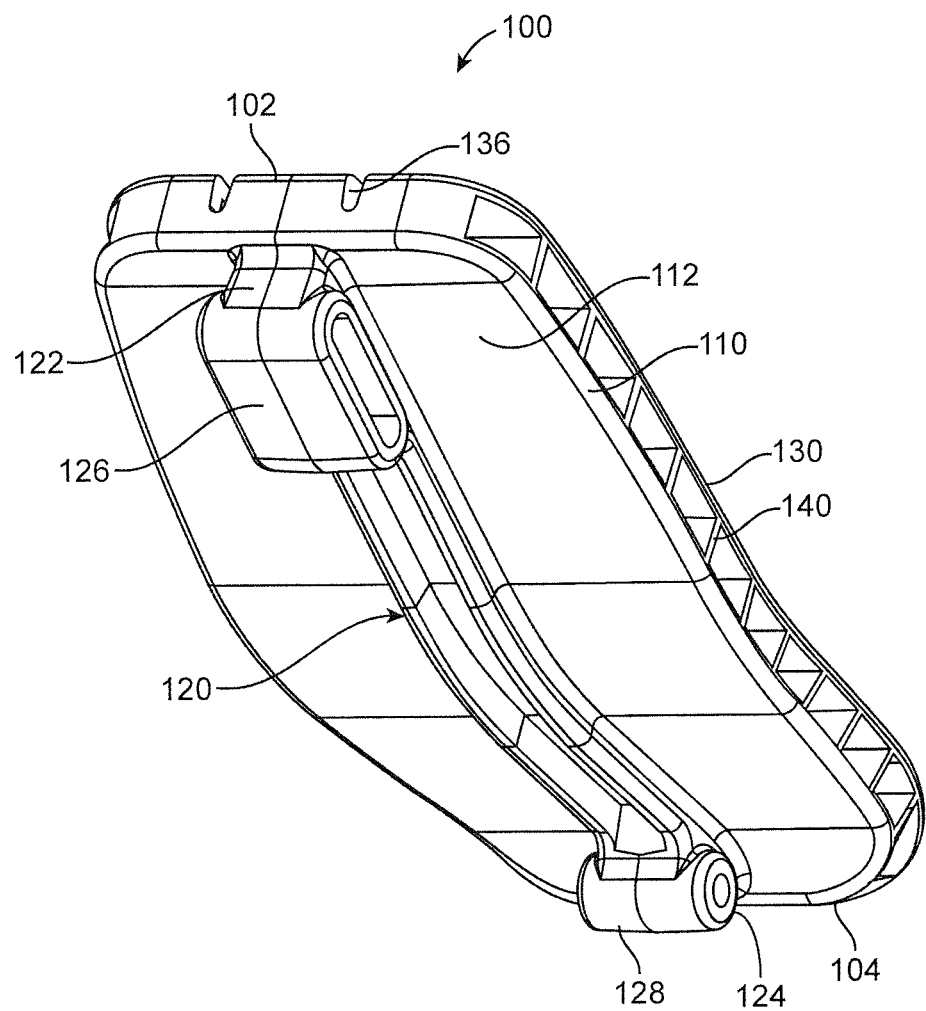
FIG. 7 illustrates a rear perspective view of a support pad according to an embodiment.

FIGS. 5-7 illustrate support pad 100, according to an embodiment. Support pad 100 can cushion recreational equipment disposed on adjustable support 10. In certain embodiments, support pad 100 can be made of a thermoplastic elastomer (TPE). Support pad 100 can be made from other materials, for example, but not limited to rubber, polymers, and foams. Other natural, synthetic, and composite materials can also be used. In certain embodiments, support pad 100 can be made from or covered with a material that reduces friction between the support pad 100 and the equipment supported thereon. For example, support pad 100 can have a felt or fabric coating. The reduced friction can facilitate loading the equipment onto one or more support pads 100, by allowing the equipment to slide along the surface of support pad 100. In certain embodiments, a pair of support pads 100 disposed on a load bar near a rear end of a vehicle can include such a reduced friction surface to help load, for example, a kayak onto the vehicle from the rear.

In certain embodiments, support pad 100 can be a single molded component formed, for example, by injection molding. The features described below enable support pad 100 and its subcomponents to move in all three dimensions. For example, support pad 100 can be compressed inwardly and at the same time move in longitudinal and lateral directions. This can allow support pad 100 to conform to the shape of the equipment being disposed on support pad 100. The subcomponents of support pad 100, for example, cells 150 and columns 152A-C, can have this multi-directional freedom of movement, enabling support pad 100 to achieve customized support for equipment of different shapes and surface profiles.

FIG. 5 illustrates a side view of support pad 100, according to an embodiment. Support pad 100 can have a first end 102 and a second end 104. As shown in the side view of FIG. 5, in certain embodiments, support pad 100 can have a base layer 110 and a contact layer 130, both of which can extend from first end 102 to second end 104. In certain embodiments, contact layer 130 can include contact surface 132 and interior surface 134. In certain embodiments, one or more grooves 138 can be formed in contact surface 132 of contact layer 130.

In certain embodiments, base layer 110 can include exterior surface 112 and interior surface 114. In certain embodiments, one or more ribs 140 can extend between contact layer 130 and base layer 110. For example, ribs 140 can extend between interior surface 134 of contact layer 130 and interior surface 114 of base layer 110. The ribs 140 can space base layer 110 from contact layer 130 and, in some embodiments, create hollow spaces 156 extending through support pad 100. Any number of ribs 140 can be included in support pad 100. In certain embodiments, there can be more than ten (10) ribs. In certain embodiments, the support pad 100 can have thirteen (13) ribs, including ribs disposed at first end 102 and second end 104. The ribs 140 can be spaced evenly or unevenly from each other along the length support pad 100. Ribs 140 can be made from the same material as contact layer 130 and/or base layer 110, or ribs 140 can be made from a different material and inserted between contact layer 130 and base layer 110.

Ribs 140 can provide additional stability for support pad 100, while at the same time being able to flex in multiple directions, depending on the direction of force locally applied, to allow support pad 100 to conform to the equipment disposed on it. For example, when force is applied approximately in line with an axis of the rib between contact layer 130 and base layer 110, the rib will tend to act as a reinforcement so that the distance between the contact layer 130 and base layer 110 at that rib remains substantially the same with little deflection. When force is applied in an oblique direction, the rib will tend to flex or deform so that the distance between the contact layer 130 and base layer 110 at that rib decreases. A thickness of ribs 140 can be increased or decreased depending on the desired stability and flexibility, and ribs can be different thicknesses. In certain embodiments, ribs can be between approximately 0.5 and 5 millimeters thick. In certain embodiments, ribs can be approximately 1 millimeter thick.

Furthermore, in certain embodiments, as shown for example in FIG. 5, the ribs 140 can be disposed at particular angles and in certain directions to provide both stability and flexibility to support pads 100. In certain embodiments, ribs that are disposed closer to first end 102 can be angled toward first end 102, meaning that there is an acute angle formed between interior surface 114 of base layer 110 and the side of the rib nearer to first end 102. The angles of the ribs can also vary, for example, from approximately 30 to 90 degrees. In certain embodiments, certain ribs can be angled at approximately 45 degrees while other ribs can be angled at approximately 60 degrees. As support pad 100 bends, twists, curves, etc. the angle can increase or decrease with respect to a starting angle measured when the support pad 100 is flat. In certain embodiments, ribs 140 can be disposed approximately perpendicular to base layer 110 and contact layer 130. Similarly, in certain embodiments, ribs disposed closer to second end 104 can be angled toward second end 104. Ribs can also be angled toward an opposite end. In certain embodiments, the ribs can alternate which end they are angled toward.

In certain embodiments, ridge 120 can extend along exterior surface 112 of base layer 110. In certain embodiments, a slotted attachment element 126 can be disposed at a first end 122 of ridge 120. In certain embodiments, a tubular attachment element 128 can be disposed at a second end 124 of ridge 120. Slotted attachment element 126 and tubular attachment element 128 can facilitate coupling with support pad 100 with load support 200. Either type of attachment element, or other attachments elements, can be used at either end. Slotted attachment element 126 can allow support pad 100 to slide with respect to the fastener coupling the support pad 100 with load support 200, whereas tubular attachment element 128 can fix an end of support pad 100 with respect to an arm of load support 200.

In one embodiment, support pad 100 can have a pad body configured to couple to load support 200 that includes a plurality of cells 150 integrally formed with the pad body and extending from the base layer 110 of the pad body. Cells 150 can be solid or hollow and each cell 150 can be configured to independently move in multiple directions with respect to the other cells. For example, cells 150 can be solid, block-shaped protrusions extending from base layer 110. In certain embodiments, support pad 100 can be made from a molded material, such as rubber, TPE, or foam. Support pad 100 can have one or more channel 136 along a length of the pad body and a plurality of grooves 138 across a width of the pad body, together defining columns and rows of cells 150 that collectively form the pad body.

FIG. 6 illustrates a front perspective view of support pad 100, according to an embodiment. In certain embodiments, support pad 100 can have one or more channels 136 in contact layer 130. In certain embodiments, support pad 100 can have two such channels 136. Channels 136 can define columns 152A, 152B, and 152C. The channels 136 can facilitate columns 152A, 152B, and 152C moving independently of one another in multiple directions. For example, if downward force (onto contact layer 130) is applied to first edge 106 and second edge 108 of support pad 100, columns 152A and 152C can rotate away from column 152B, while column 152B can remain stationary. In certain embodiments where ridge 120 is disposed anterior to column 152B, column 152B can be more rigid than the other columns. In another example, if upward force (onto base layer 110) is applied to first edge 106 and second edge 108 of support pad 100, columns 152A and 152C can rotate toward column 152B. In certain embodiments, this can close the gap of channels 136 such that columns 152A and 152C touch respective edges of column 152B.

In certain embodiments, channels 136 can define notches 142 in ribs 140 in the portion of the rib that extends across channel 136. By removing material from ribs 140, notches 142 can decrease the rigidity of ribs 140 at notches 142, which can facilitate the multi-directional movement of columns 152A-C described above. All or some of the ribs can include notches 142 in channels 136.

In certain embodiments, contact surface 132 of contact layer 130 can include one or more grooves 138. Support pad 100 can have grooves 138 whether or not it also includes channels (see FIGS. 18A-B). Grooves 138 can improve the grip of contact layer 130 on the equipment. Similar to channels 136, grooves 138 can segment support pad 100 into a plurality of rows 154, which can move independently in multiple directions. In certain embodiments, grooves 138 can extend transversely from first edge 106 to second edge 108 of support pad 100. In certain embodiments, grooves 138 can extend only across a portion of contact layer 130. In certain embodiments, grooves 138 can correspond to an underlying rib 140 directly beneath groove 138.

Channels 136 and grooves 138 in contact layer 130 can define individual cells 150 of support pad 100. By having individual cells 150 that can move in multiple directions independent of one another, support pad 100 can conform to many shapes of equipment, providing customized support. For example, when a watercraft hull is disposed on support pad 100, columns and rows of cells 150 can move independently to conform to the shape of the hull, thereby providing superior support.

In certain embodiments, support pad 100 can be symmetrical about longitudinal axis 107. In certain embodiments, support pad 100 can be symmetrical about horizontal axis 103. In other embodiments, support pad 100 can be asymmetrical about longitudinal axis 107 and/or horizontal axis 103. For example, in certain embodiments, the length (in the direction of longitudinal axis 107) of a row of cells near first end 102 can be shorter than a row of cells near second end 104. Similarly, in certain embodiments, channels 136 can be disposed asymmetrically from longitudinal axis 107 such that the widths (in the direction of horizontal axis 103) of columns 152A, 152B, and 152C are different. In certain embodiments, channels 136 can be approximately parallel to longitudinal axis 107. In certain embodiments, channels 136 can be curved.

FIG. 7 illustrates a rear perspective view of support pad 100, according to an embodiment. FIG. 7 shows ridge 120 disposed along exterior surface 112 of base layer 110. Ridge 120 can be a single ridge extending from base layer 110, or as shown in FIG. 7, multiple ridges extending from base layer 110. As described above with respect to FIG. 5, in certain embodiments, ridge 120 can have a slotted attachment element 126 disposed at a first end 122 and a tubular attachment element 128 disposed at a second end 124. Attachment elements 126, 128 can be coupled with arms of load support 200 by fasteners extending through the arms and through the attachment elements 126, 128. Ridge 120 itself can facilitate coupling with the anus by being disposed within corresponding channels in the arms. In certain embodiments, a width of ridge 120 can be approximately the same as the channels in the arms. This can prevent support pad 100 from sliding sideways on the arms when force is applied in a sideways direction by a load disposed on support pad 100.

Figure 8:
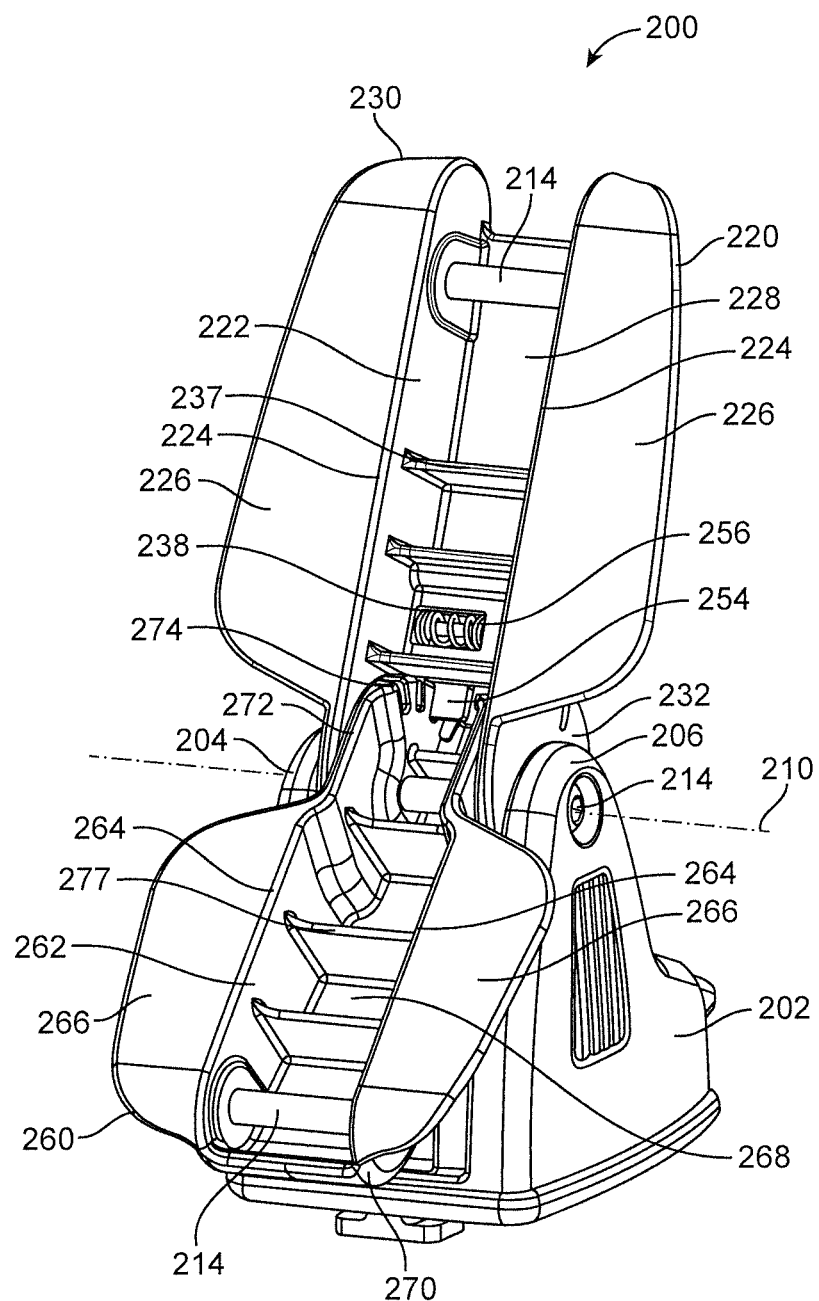
FIG. 8 illustrates a perspective view of a load support according to an embodiment.

FIG. 8 illustrates a perspective view of load support 200, according to an embodiment. FIGS. 9-14 illustrate various components of load support 200, according to embodiments. Load support 200 can include base 202, first arm 220, and second arm 260. In certain embodiments, a single fastener 214 can couple base 202, first arm 220, and second arm 260 along a pivot axis 210. As such, first arm 220 and second arm 260 can rotate about pivot axis 210 while base 202 remains stationary.

As shown in FIG. 8, in certain embodiments, first arm 220 can include rear panel 228, with side panels 222 extending therefrom. In certain embodiments, wings 226 can extend from top edges 224 of side panels 222. Wings 226 can provide additional contact surface to buttress support pad 100. Wings 226 can take any shape or size. In certain embodiments, one or more braces 237 can extend between side panels 222 of first arm 220 to provide additional structure and rigidity to first arm 220. First arm 220 can take other suitable shapes and configurations that provide a backing and attachment location for support pad 100. As shown in FIG. 8, in certain embodiments, a fastener 214 can extend through side panels 222 of first arm 220 near distal end 230. Fastener 214 can couple first arm 220 with support pad 100, for example, through slotted attachment element 126 at a first end 122 of ridge 120. In certain embodiments, ridge 120 can be disposed in the space between side panels 222 of first arm 220. In certain embodiments, first arm 220 can include a cavity 238. The cavity 238 can house a spring 256 of a slide lock 250, as discussed in more detail below.

The basic structure and function of the elements of second arm 260 can be similar to first arm 220. For example, in certain embodiments, second arm 260 can include rear panel 228 with side panels 222 extending therefrom and wings 266 extending from top edges 264 of side panels 262. One or more braces 277 can extend between side panels 262 of second arm 260. In certain embodiments, a fastener 214 can extend through side panels 222 of second arm 260 near a distal end 270 of second arm 260. Second arm 260 can be shorter or longer than first arm 220, or the arms 220, 260 can be the same length.

In certain embodiments, a proximal end of second min 260 can be disposed interior to a proximal end 232 of first arm 220. In certain embodiments, proximal end 272 of second arm 260 can include one or more notches 274. For example, in certain embodiments, second arm 220 can have four notches. Notches 274 can be configured to receive a tab 254 of plate 252 of slide lock 250 in order to secure first arm 220 with second arm 260. As will be discussed in more detail below, when slide lock 250 is disengaged, first arm 220 and second arm 260 can rotate independently about pivot axis 210 relative to each other. Plate 252 can then slide into another one of the notches 274 in second arm 260 to fix first arm 220 and second arm 260 relative to each other at a different fixed angle such that the arms 220, 260 can rotate together about pivot axis 210.

Figure 9:
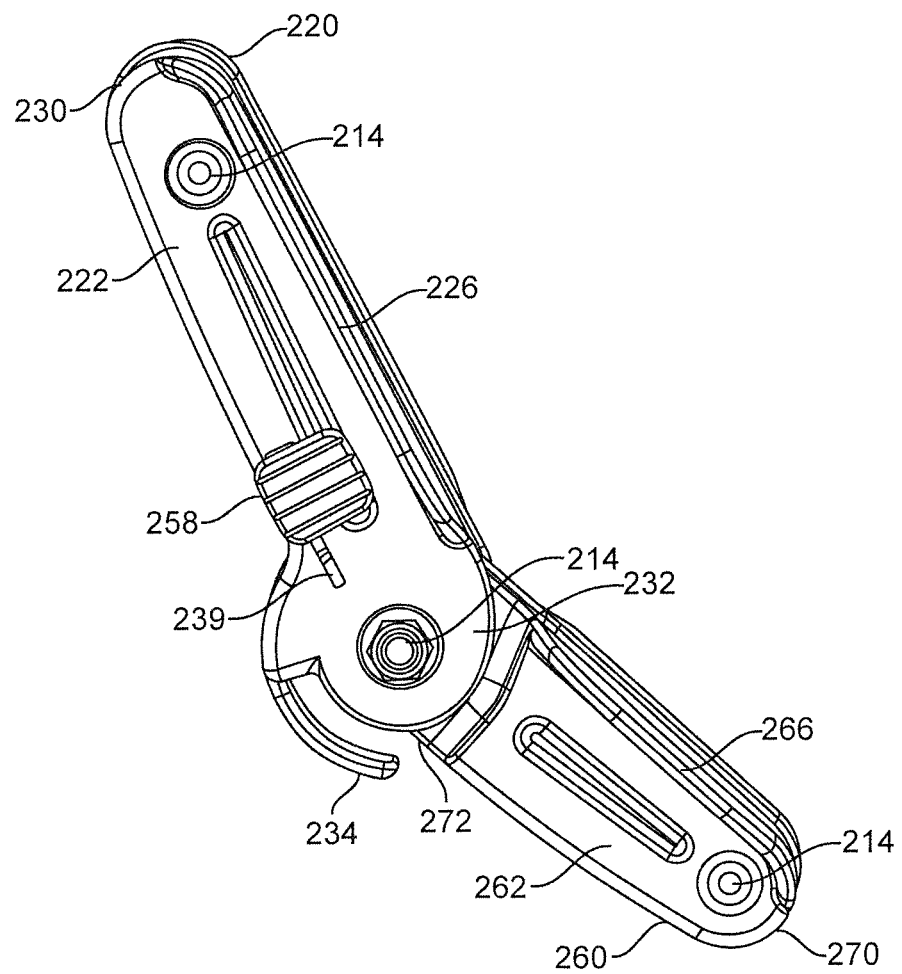
FIG. 9 illustrates a side perspective view of arms of a load support according to an embodiment.

FIG. 9 illustrates a side perspective view of first arm 220 coupled with second arm 260, according to an embodiment. First arm 220 can be coupled with second arm 260 by a fastener 214 extending along pivot axis 210. In certain embodiments, proximal end 232 of first arm 220 and proximal end 272 of second arm 260 can be coupled with each other. In certain embodiments, fasteners 214 can extend through side panels 222 of first arm 220 and similarly through side panels 262 of second arm 260. In certain embodiments, fasteners 214 can be located near distal ends 230 and 270 of first arm 220 and second arm 260, respectively, to couple support pad 100 with the arms 220, 260.

As shown in FIG. 9, in certain embodiments, first arm 220 can include guard 234, which can protect the proximal ends 232, 272 of arms 220, 260 where they are coupled together and rotate about pivot axis 210. In certain embodiments, first arm 220 can include slot 239 for a slide lock 250. In certain embodiments, a button 258 can facilitate disengagement of slide lock 250 from a locked position, thereby allowing first arm 220 and second arm 260 to rotate about pivot axis 210 with respect to each other.

Figure 10:
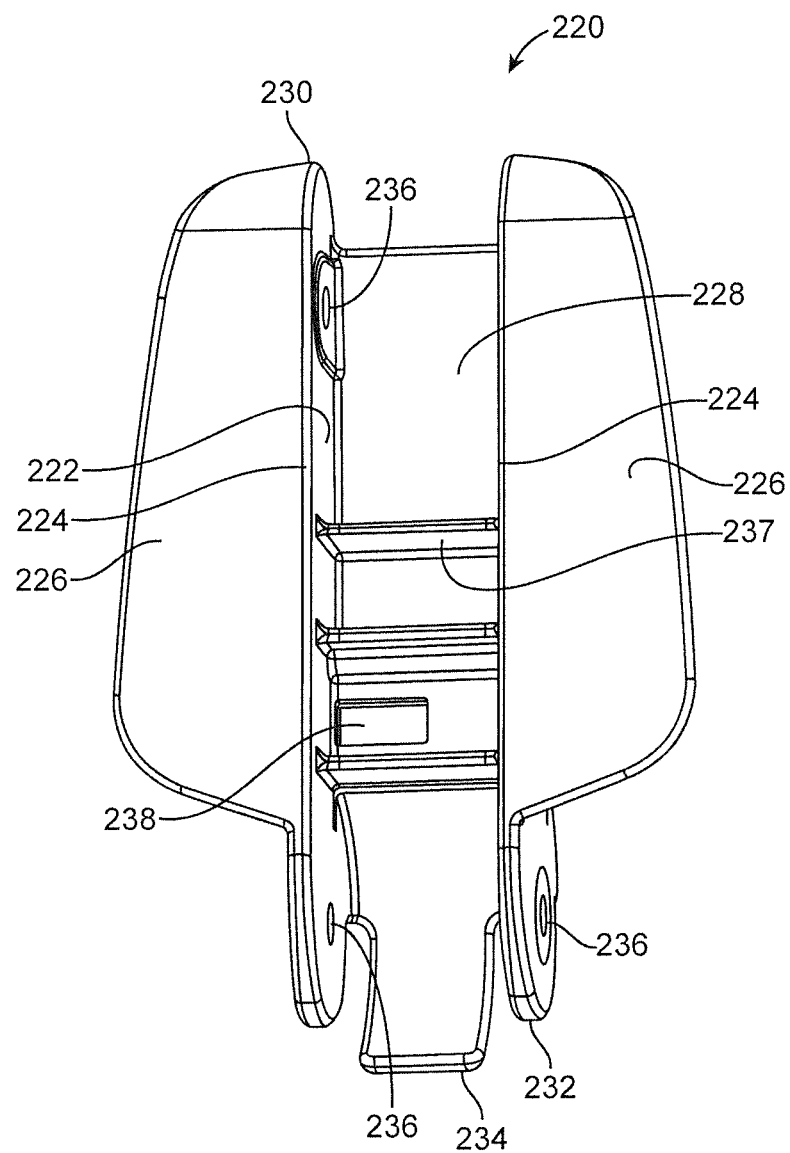
FIG. 10 illustrates a front perspective view of an arm of a load support according to an embodiment.

FIG. 10 illustrates a front perspective view of first arm 220, according to an embodiment. As discussed above, in certain embodiments, first arm 220 can include rear panel 228, side panels 222, and wings 226 extending from top edges 224 of side panels 222. In certain embodiments, first arm 220 can have braces 237 extending between side panels 222. In certain embodiments, first arm 220 can have holes 236 extending through side panels 222 near a distal end 230 of first arm 220. Fasteners 214 can extend through holes 236 in order to couple first arm 220 with support pad 100.

In certain embodiments, additional holes 236 can extend through side panels 222 of first arm 220 near a proximal end 232 of first arm 220. A fastener can extend through holes 236 to couple first arm 220 with second arm 260 and with base 202 of load support 200. In certain embodiments, first arm 220 can include a guard 234 extending from rear panel 228 near distal end 232 of arm 220. Guard 234 can protect the interior rotation and locking mechanisms of load support 200. In certain embodiments, first arm 220 can include a cavity 238 within which a spring 256 and other elements of a slide lock 250 can be disposed.

Figure 11:
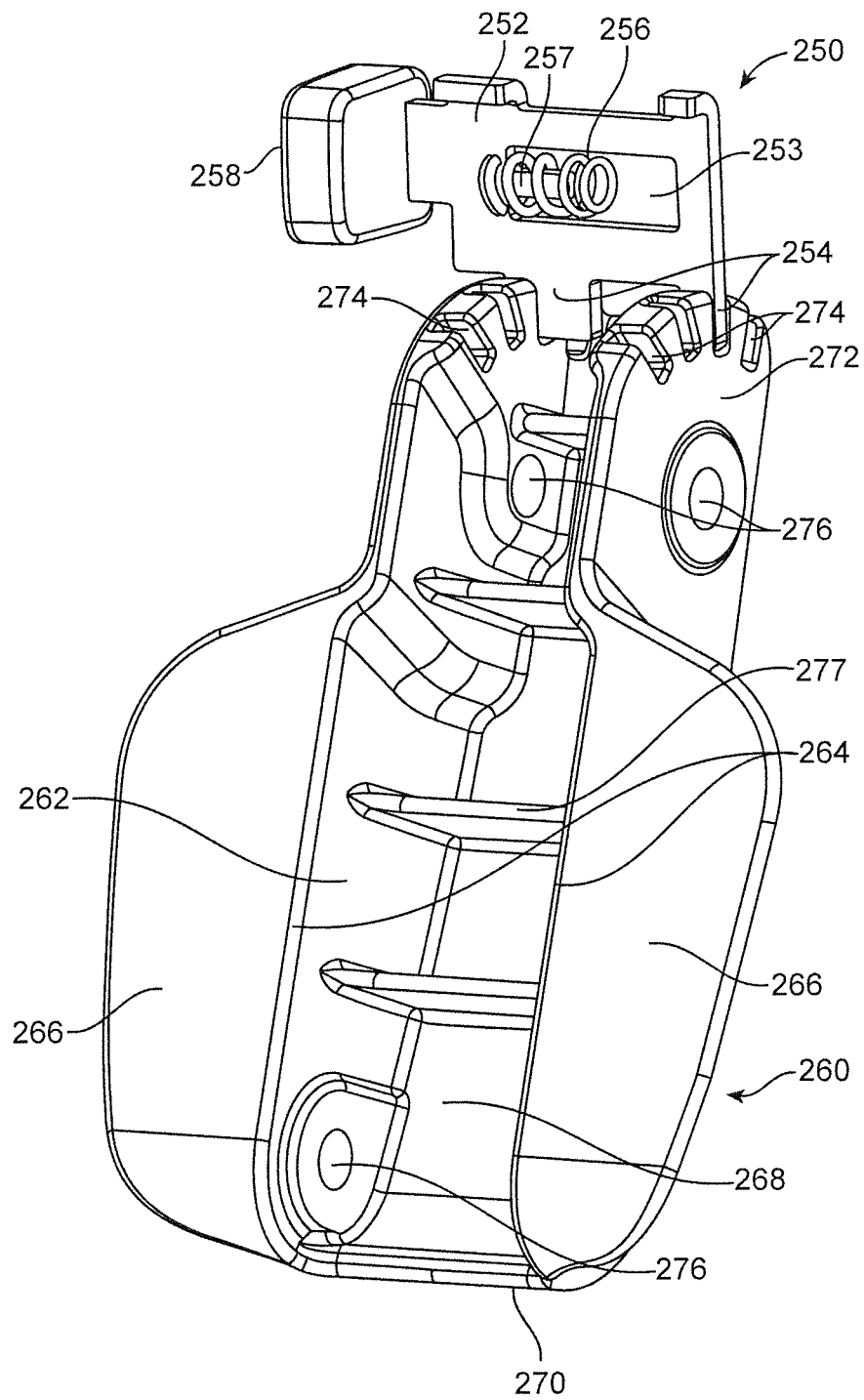
FIG. 11 illustrates a front perspective view of an arm and a lock of a load support according to an embodiment.

FIG. 11 illustrates second arm 260 and slide lock 250, according to an embodiment. In certain embodiments, second arm 260 can have rear panel 268, side panels 262, and wings 266 extending from top edges 264 of side panels 262. In certain embodiments, one or more braces 277 can extend between side panels 262 of second arm 260. In certain embodiments, holes 276 can extend through side panels 262 of second arm 260 near distal end 270 of second arm 260. A fastener can extend through holes 276 to couple second arm 260 with support pad 100. In certain embodiments, additional holes 276 can extend through side panels 262 of second arm 260 near proximal end 272 of side panel 262. A fastener can extend through holes 276 along pivot axis 210 to couple second arm 260 with first arm 220 and also with base 202 of load support 200.

In certain embodiments, proximal end 272 of second arm 260 can have a plurality of notches 274 in one or both side panels 262. For example, each side panel 262 can have two, three, four, five, six, or more notches 274. As shown in FIG. 11, in certain embodiments, each side panel 262 of second arm 260 can have four notches 274. In certain embodiments, one side panel 262 can have notches 274 on an interior side while the other side panel 262 can have notches 274 on an exterior side. In certain embodiments, notches 274 can extend entirely through side panels 262.

A slide lock 250 can be configured to couple with notches 274 to fix an angle of second arm 260 relative to first arm 220. In certain embodiments, slide lock 250 can include plate 252, which can have one or more tabs 254. The tabs 254 can be sized to fit within the notches 274 of second arm 260. In certain embodiments, plate 252 can have a cutout 253 within which a spring 256 can be disposed, for example, about a prong 257. Spring 256 can bias slide lock 250 into engagement with notches 274.

In certain embodiments, a button 258 can be coupled or integrally formed with plate 252 of slide lock 250 to facilitate disengaging slide lock 250 from notches 274. For example, when tabs 254 are engaged with notches 274, button 258 can be pushed to translate plate 252 sideways such that tabs 254 do not engage notches 274. Second arm 260 and first arm 220 can then be rotated about pivot axis 210 relative to each other. As the arms 220, 260 rotate, tabs 254 can slide along the portion of side panels 262 between the notches 274. When the next adjacent notch 274 reaches tabs 254 of plate 252, spring 256 can bias the tabs 254 into the next notch 274 of second arm 260. This can lock second arm 260 and first arm 220 back in place with respect to each other at a different angle. Thus, rotating the arms 220, 260 in a first direction can increase an angle between the arms and rotating the arms in a second direction can decrease the angle between the arms.

Figure 12:
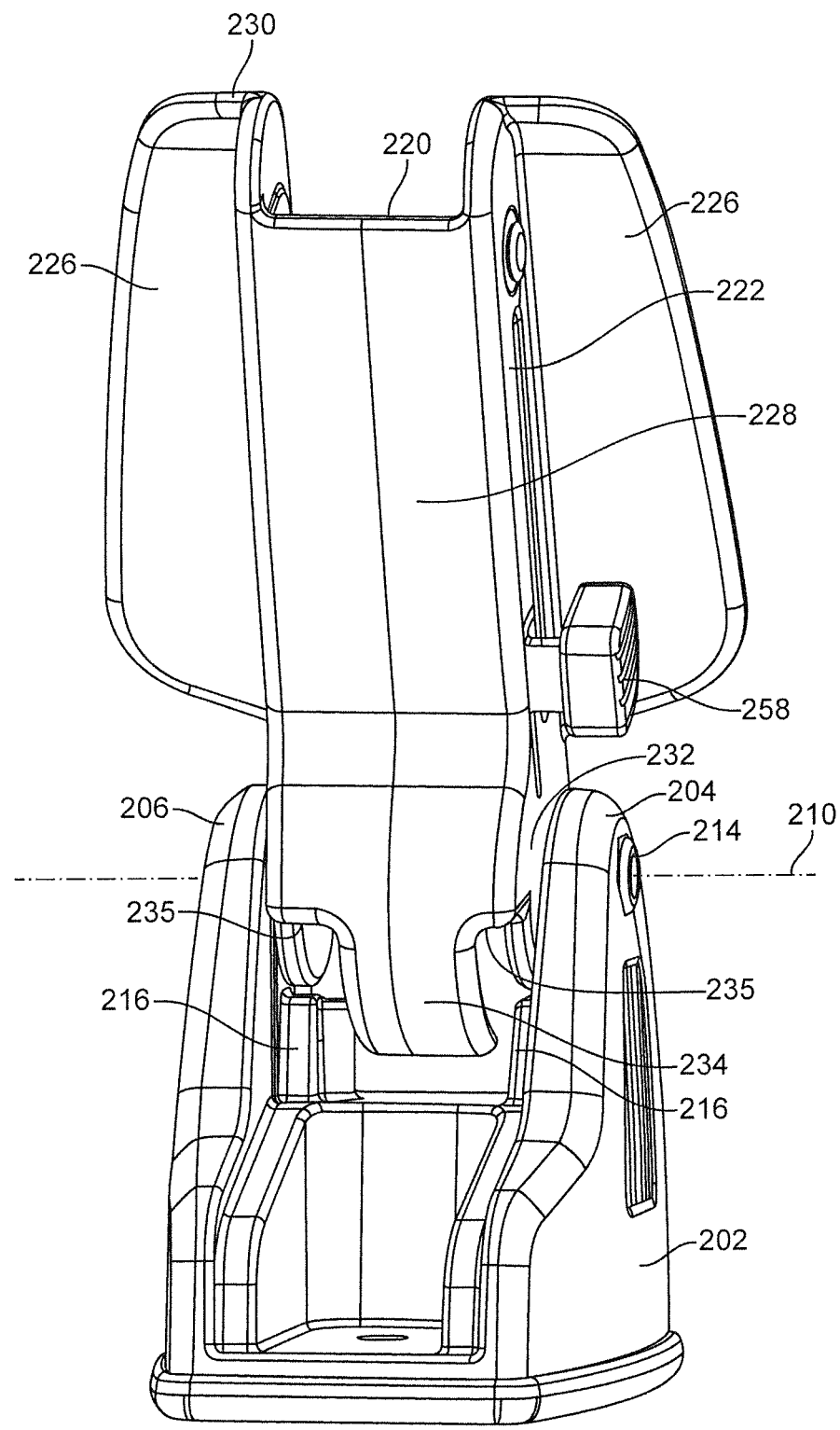
FIG. 12 illustrates a rear perspective view of an arm and a base of a load support according to an embodiment.

FIG. 12 illustrates first arm 220 coupled with base 202, according to an embodiment. In certain embodiments, first arm 220 can be disposed between a first upright 204 and a second upright 206 of base 202. A fastener 214 can extend through upright 204, proximal end 232 of first arm 220, and second upright 206 along pivot axis 210. This can allow first arm 220 to rotate about pivot axis 210 while base 202 remains fixed on a load bar. In certain embodiments, base 202 can include one or more rear stopping surfaces 216, which can act as a mechanical stop to limit the rotation of first arm 220. In certain embodiments, first arm 220 can have a flange 235 disposed on either side of guard 234. Flanges 235 can engage rear stopping surfaces 216 in order to prevent first arm 220 from rotating beyond a desired position. In certain embodiments, rear stopping surfaces 216 can limit first arm 220 from rotating beyond 90 degrees (i.e., perpendicular) with respect to uprights 204, 206 of base 202 (see, e.g., FIG. 15B). By disposing rear stopping surfaces 216 at different locations, stopping angles greater than or less than 90 degrees between first arm 220 and base 202 can be permitted.

Figure 13:
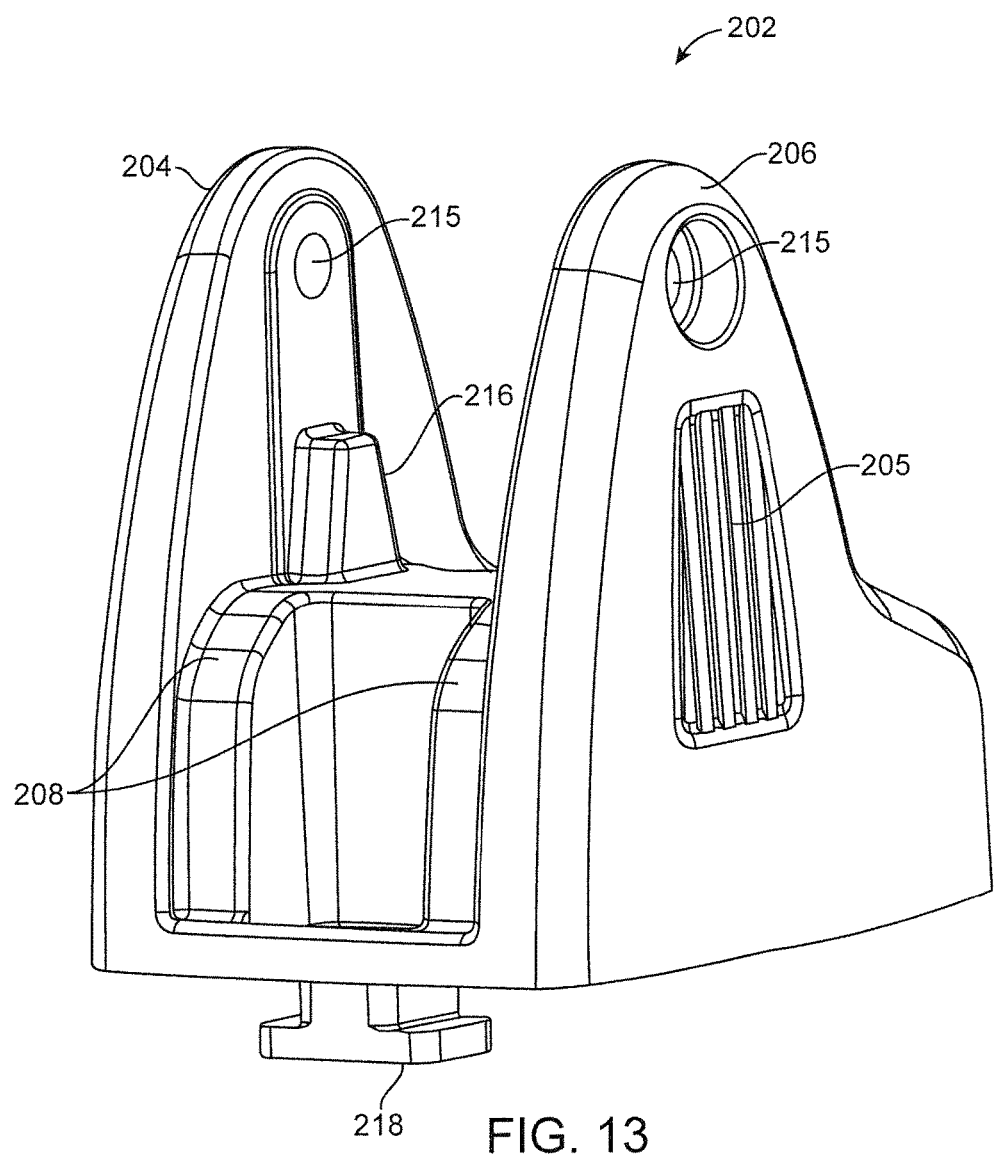
FIG. 13 illustrates a perspective view of a base of a load support according to an embodiment.

FIG. 13 illustrates a front perspective view of base 202, according to an embodiment. In certain embodiments, base 202 can include first upright 204 and second upright 206. In certain embodiments, holes 215 can extend through first and second uprights 204, 206. A fastener can extend through holes 215 along a pivot axis 210 to couple base 202 with first arm 220 and second arm 260. In certain embodiments, base 202 can include T-bolt 218 to facilitate coupling base 202 with a load bar. In certain embodiments, base 202 can include one or more front stopping surfaces 208. Similar to rear stopping surfaces 216, front stopping surfaces 208 can limit the rotation of second arm 260 with respect to base 202. In certain embodiments, rear panel 268 of second arm 260 can engage front stopping surfaces 208 of base 202, thereby preventing second arm 260 from rotating beyond a desired point, for example, 45 degrees between second arm 260 and uprights 204, 206. In certain embodiments, base 202 can include gripping surface 205, which can assist in holding base 202 while positioning base 202 onto a load bar.

Figure 14:
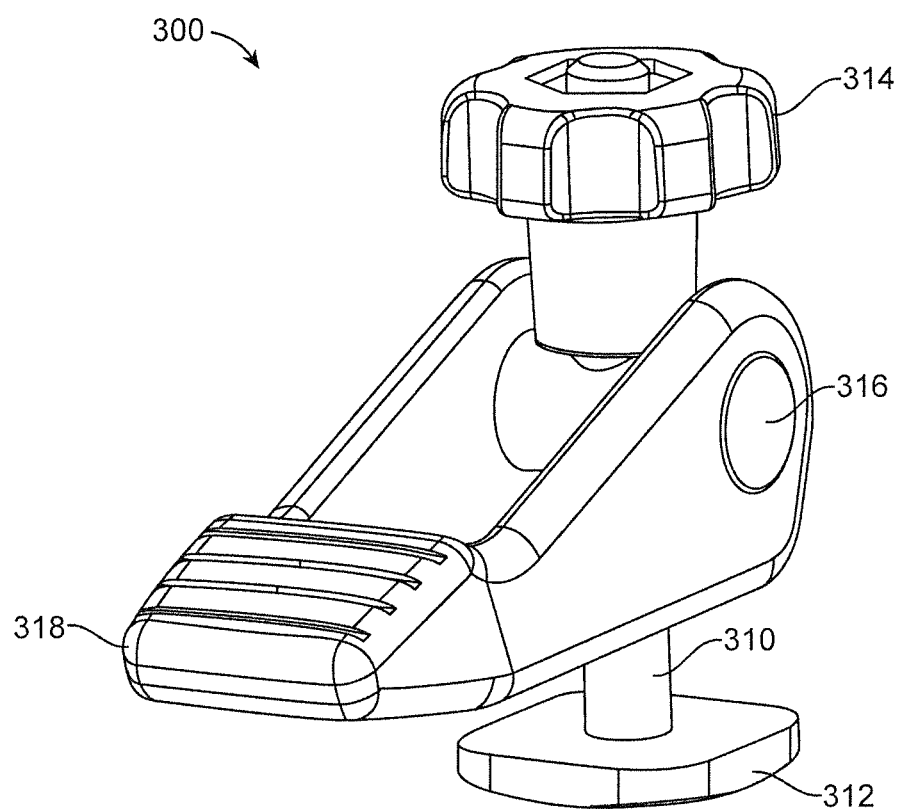
FIG. 14 illustrates a perspective view of a load bar attachment device according to an embodiment.

FIG. 14 illustrates load bar attachment device 300, according to an embodiment. Load bar attachment device 300 can couple load support 200 to a load bar. In certain embodiments, load bar attachment device 300 can include T-bolt 310 that extends through a bottom of base 202. A foot 312 of T-bolt 310 can be disposed within a groove on a load bar to couple base 202 with the load bar. In certain embodiments, a threaded head 314 can couple to T-bolt 310 to secure it to base 202. In certain embodiments, a core 316 can extend through a lever 318 and T-bolt 310 can extend through core 316. Lever 318 can be pressed and lifted to secure and release base 202, respectively, with the load bar. Other known load bar attachment devices can be used to secure base 202 of load support 200 to a load bar.

FIGS. 15A-18B illustrate exemplary embodiments of adjustable support 10 in different configurations and with first arm 220 and second arm 260 disposed at various angles with respect to each other. These examples are not meant to be limiting. Other configurations are contemplated, for example, with different maximum rotation angles of the arms 220, 260 with respect to the base 202 and different angles of the arms 220, 260 with respect to each other. First arm 220 and second arm 260 can be disposed at an obtuse, right, or acute angle with respect to each other, where the side of the arms 220, 260 coupled with the support pad 100 define the angle. For example, arms 220, 260 can be disposed from approximately 15 to 180 degrees with respect to each other. In certain embodiments, arms 220, 260 can be disposed at approximately 90 degrees with respect to each other.

Figure 15A:
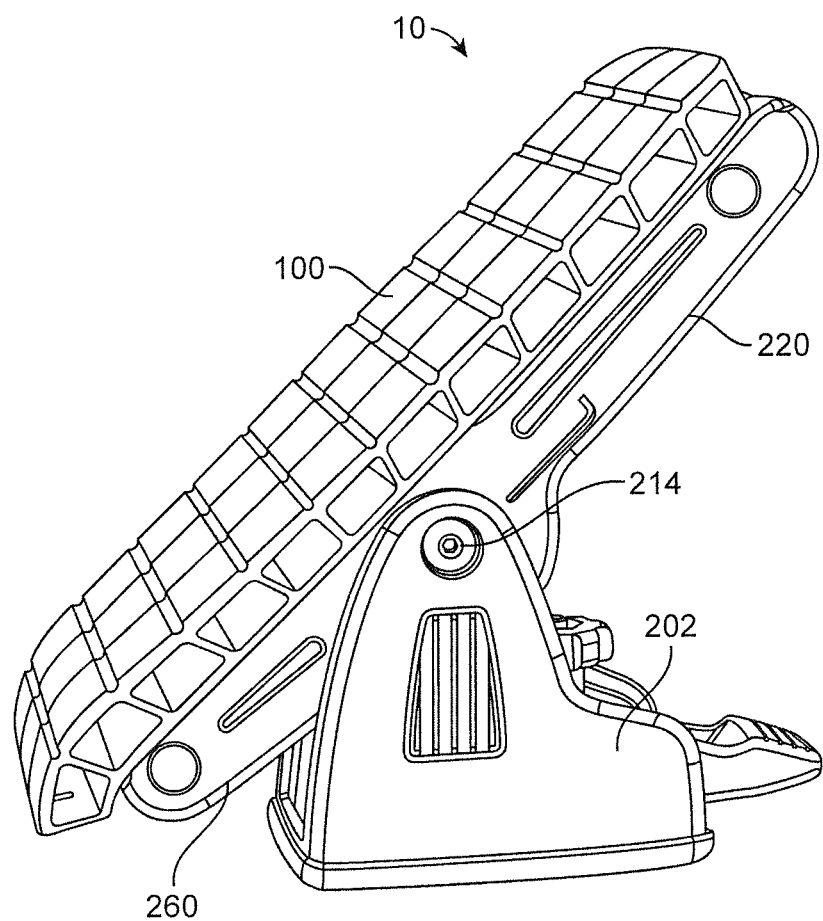
FIG. 15A illustrates an adjustable support in a first configuration according to an embodiment.
Figure 15B:
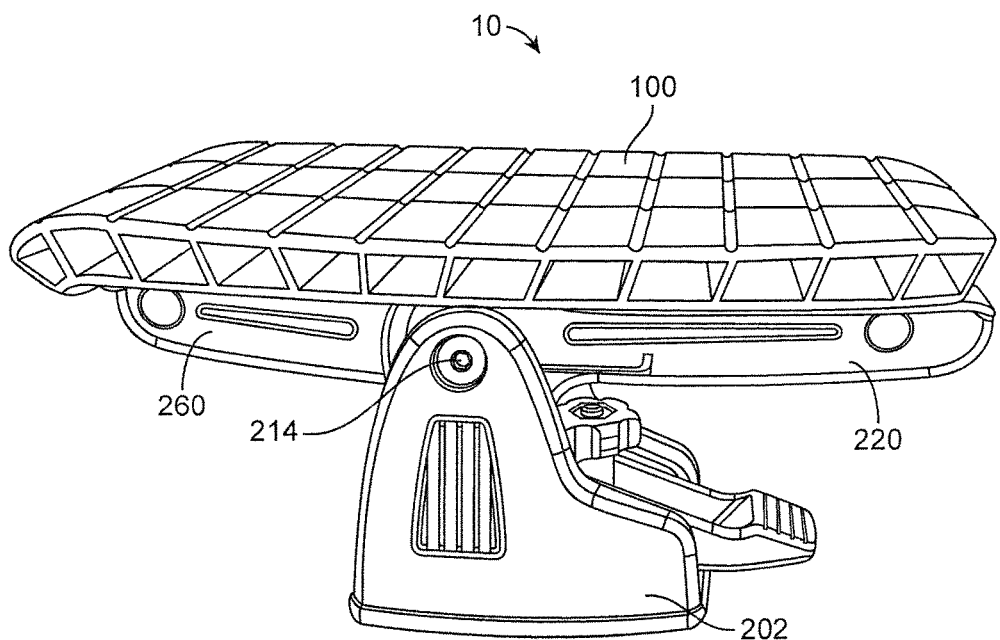
FIG. 15B illustrates the adjustable support of FIG. 15A in a second configuration according to an embodiment.

FIGS. 15A and 15B illustrate adjustable support 10 in a first configuration and a second figuration, respectively. In FIGS. 15A and 15B, first arm 220 and second arm 260 are disposed an angle of approximately 180 degrees with respect to each other. In certain embodiments, this can be when slide lock 250 is disposed in a first notch 274 (closest to rear panel 268 in FIG. 11) of second arm 260. FIG. 15A illustrates adjustable support 10 rotated such that second arm 260 contacts front stopping surfaces 208. FIG. 15B illustrates adjustable support 10 rotated such that first arm 220 contacts rear stopping surfaces 216. Thus, in certain embodiments, support pad 100 can be flat when it is disposed on first arm 220 and second arm 260. The arms 220, 260 are free to rotate anywhere between the first and second configurations before and after a load is disposed on support pad 100. This can improve the contact between support pad 100 and the load.

Figure 16A:
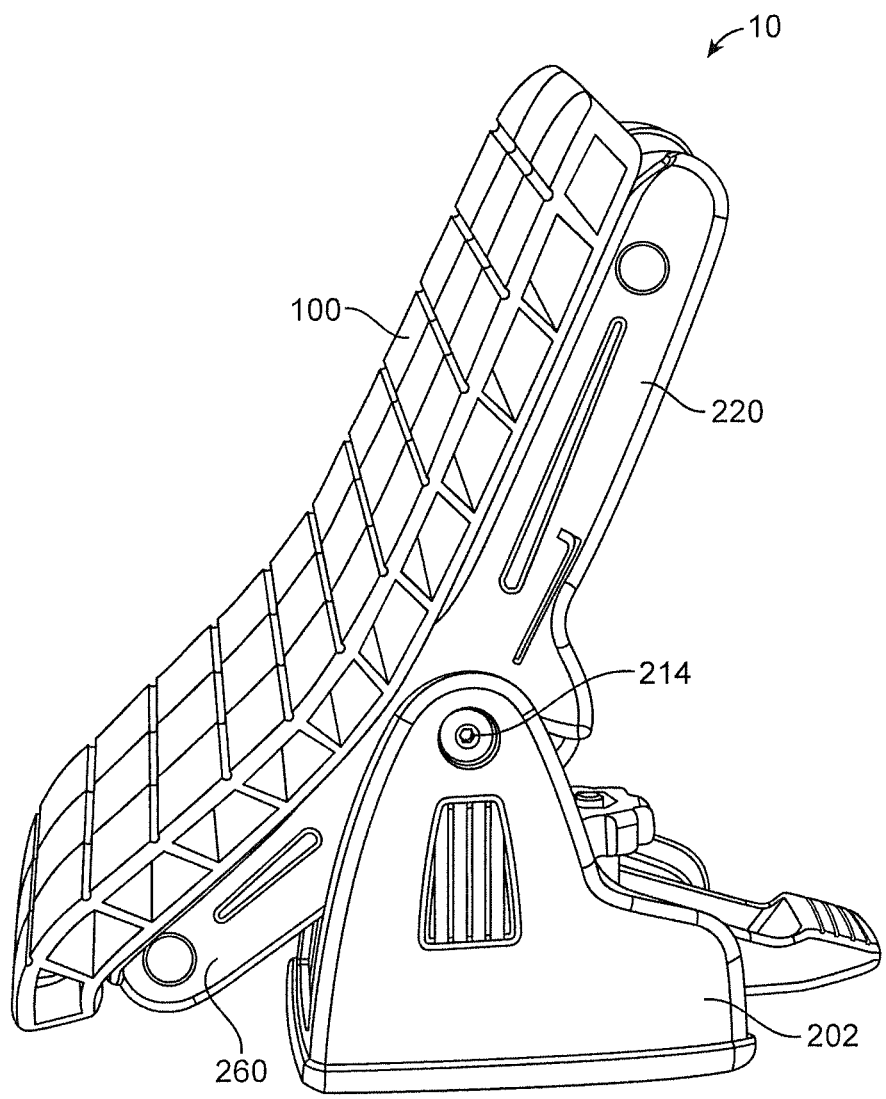
FIG. 16A illustrates an adjustable support in a first configuration according to an embodiment.
Figure 16B:
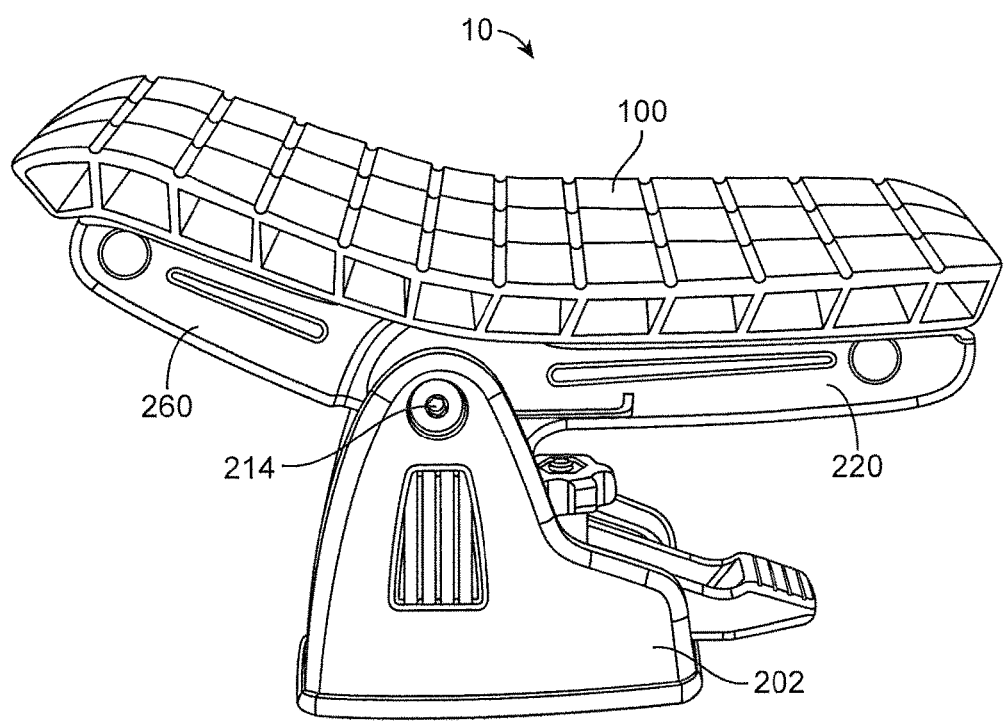
FIG. 16B illustrates the adjustable support of FIG. 16A in a second configuration according to an embodiment.

FIGS. 16A and 16B illustrate adjustable support 10 in a first configuration and a second figuration, respectively. FIG. 16A illustrates adjustable support 10 rotated such that second arm 260 contacts front stopping surfaces 208. FIG. 16B illustrates adjustable support 10 rotated such that first arm 220 contacts rear stopping surfaces 216. FIGS. 16A-B can represent when slide lock 250 is disposed in a second notch 274 of second arm 260. In certain embodiments, first arm 220 and second arm 260 can be disposed at an angle of approximately 160 degrees with respect to each other when slide lock 250 is disposed in the second notch 274.

Figure 17A:
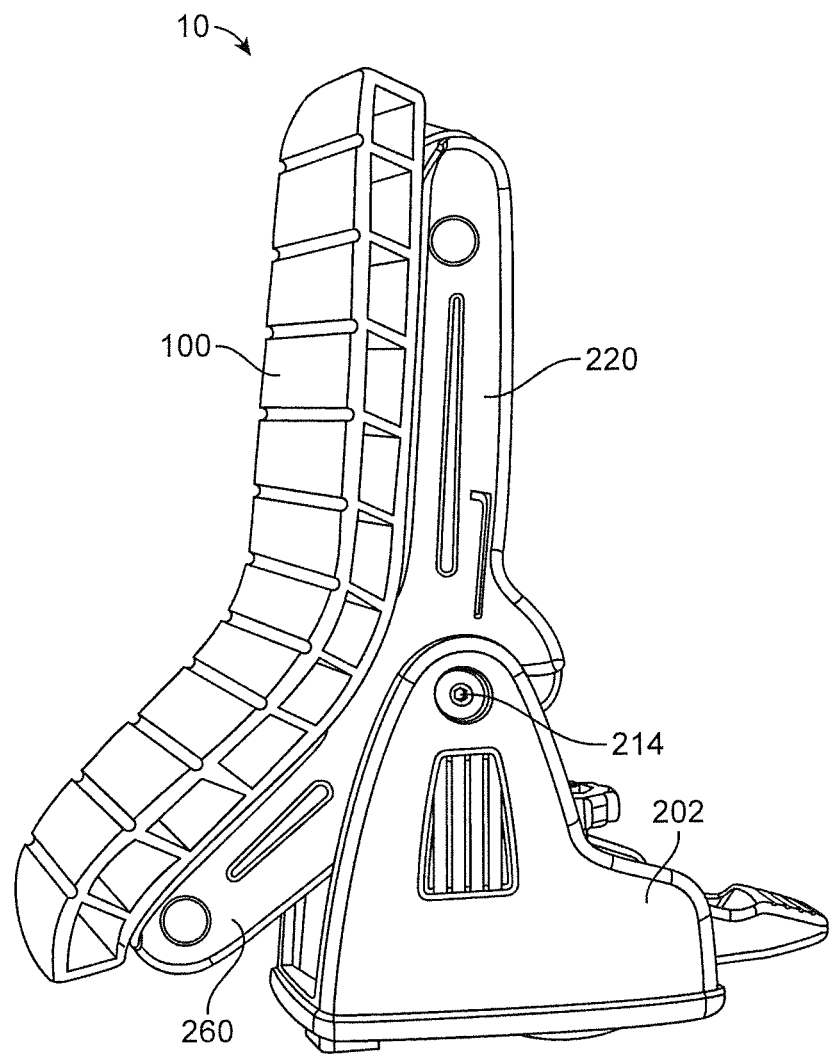
FIG. 17A illustrates an adjustable support in a first configuration according to an embodiment.
Figure 17B:
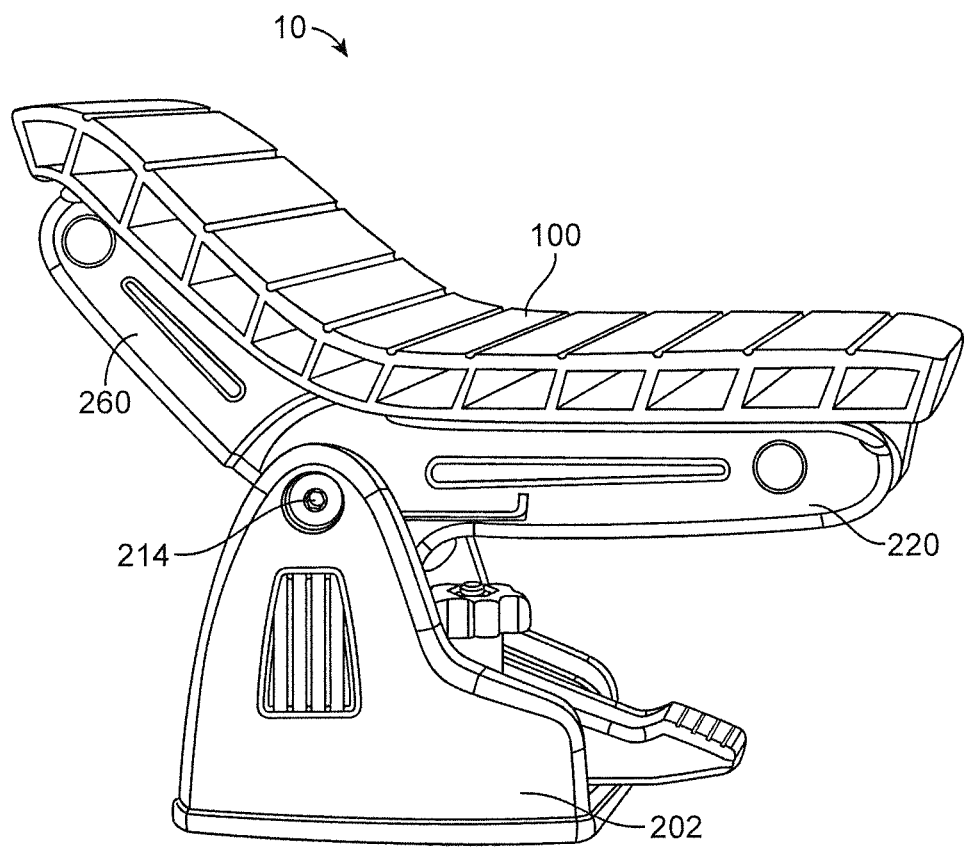
FIG. 17B illustrates the adjustable support of FIG. 17A in a second configuration according to an embodiment.

FIGS. 17A and 17B illustrate adjustable support 10 in a first configuration and a second figuration, respectively. FIG. 17A illustrates adjustable support 10 rotated such that second arm 260 contacts front stopping surfaces 208. FIG. 17B illustrates adjustable support 10 rotated such that first arm 220 contacts rear stopping surfaces 216. FIGS. 17A-B can represent when slide lock 250 is disposed in a third notch 274 of second arm 260. In certain embodiments, first arm 220 and second arm 260 can be disposed at an angle of approximately 140 degrees with respect to each other when slide lock 250 is disposed in the third notch 274.

Figure 18A:
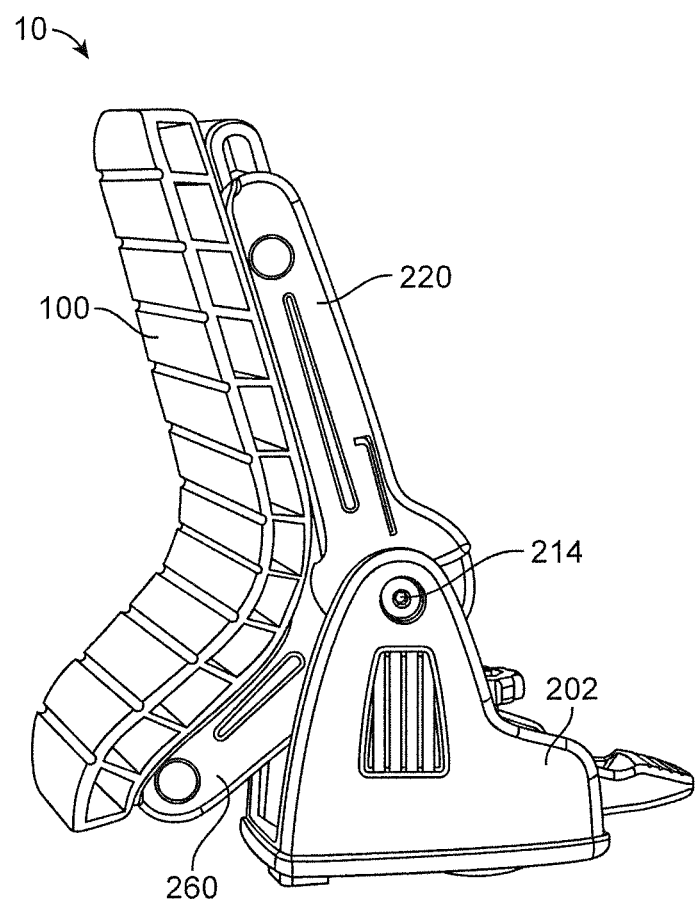
FIG. 18A illustrates an adjustable support in a first configuration according to an embodiment.
Figure 18B:
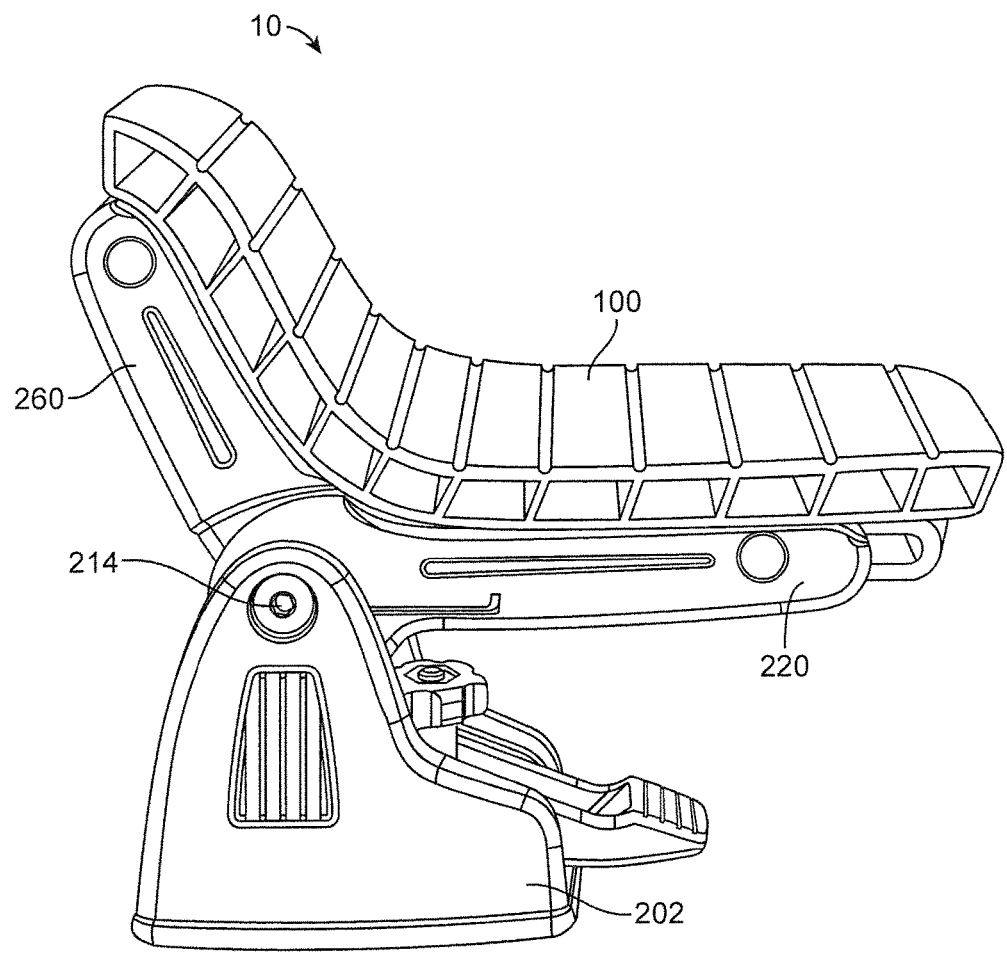
FIG. 18B illustrates the adjustable support of FIG. 18A in a second configuration according to an embodiment.

FIGS. 18A and 18B illustrate adjustable support 10 in a first configuration and a second figuration, respectively. FIG. 18A illustrates adjustable support 10 rotated such that second arm 260 contacts front stopping surfaces 208. FIG. 18B illustrates adjustable support 10 rotated such that first arm 220 contacts rear stopping surfaces 216. FIGS. 18A-B can represent when slide lock 250 is disposed in a fourth notch 274 of second arm 260. In certain embodiments, first arm 220 and second arm 260 can be disposed at an angle of approximately 120 degrees with respect to each other when slide lock 250 is disposed in the fourth notch 274.

Figure 19:
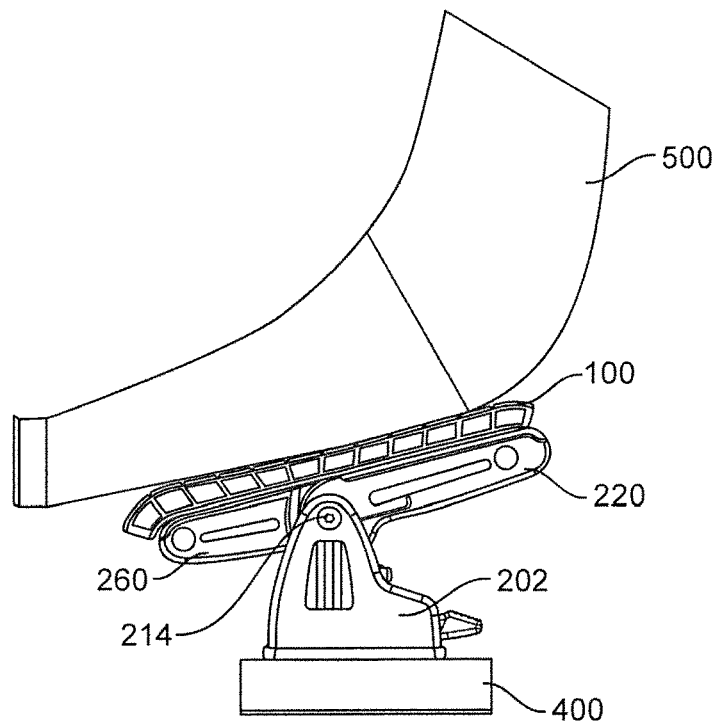
FIG. 19 illustrates a hull disposed on an adjustable support according to an embodiment.
Figure 20:
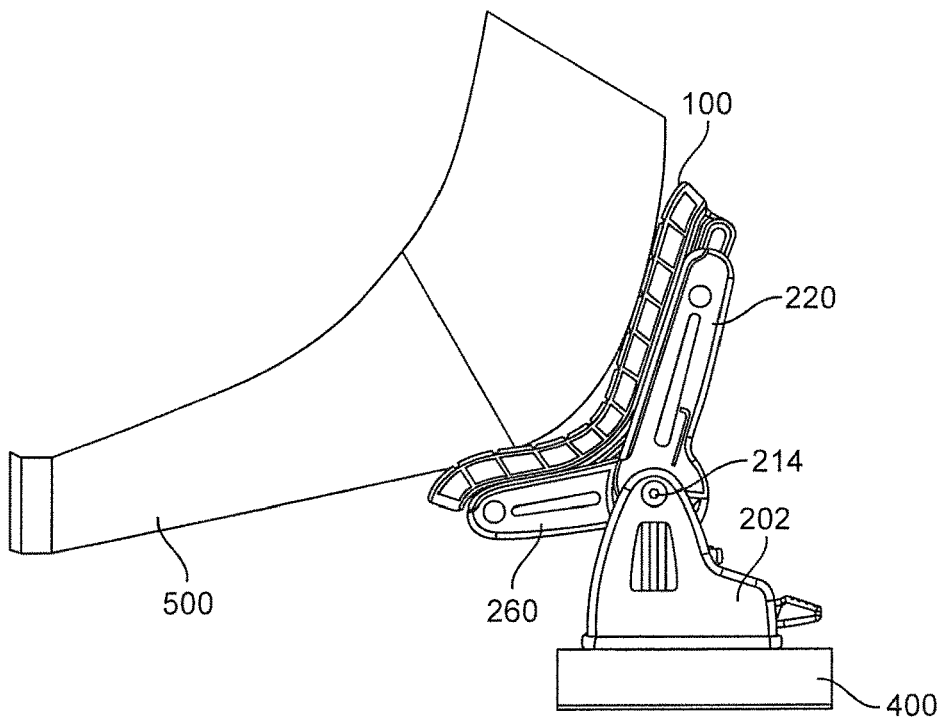
FIG. 20 illustrates a hull disposed on an adjustable support according to an embodiment.

FIGS. 19 and 20 illustrate adjustable support 10 supporting two different shaped hulls 500, according to embodiments. In FIG. 19, first arm 220 is disposed an angle of approximately 180 degrees with respect to second arm 260 such that support pad 100 is flat. This can allow adjustable support 10 to support a hull 500 with a flat surface, as shown in FIG. 19. As discussed above and shown in FIG. 19, the arms 220, 260 can be disposed at a position at or between a first configuration where second arm 260 contacts front stopping surfaces 208 and a second figuration where first arm 220 contacts rear stopping surfaces 216. FIG. 20 illustrates first arm 220 of adjustable support 10 disposed at an angle of approximately 120 degrees with respect to second arm 260. This can allow adjustable support 10 to support a hull 500 with a curved portion. As shown in by FIGS. 19 and 20, arms 220 and 260 can rotate about pivot axis 210 and fastener 214 anywhere between the front stopping surface and rear stopping surface.

Figure 21:
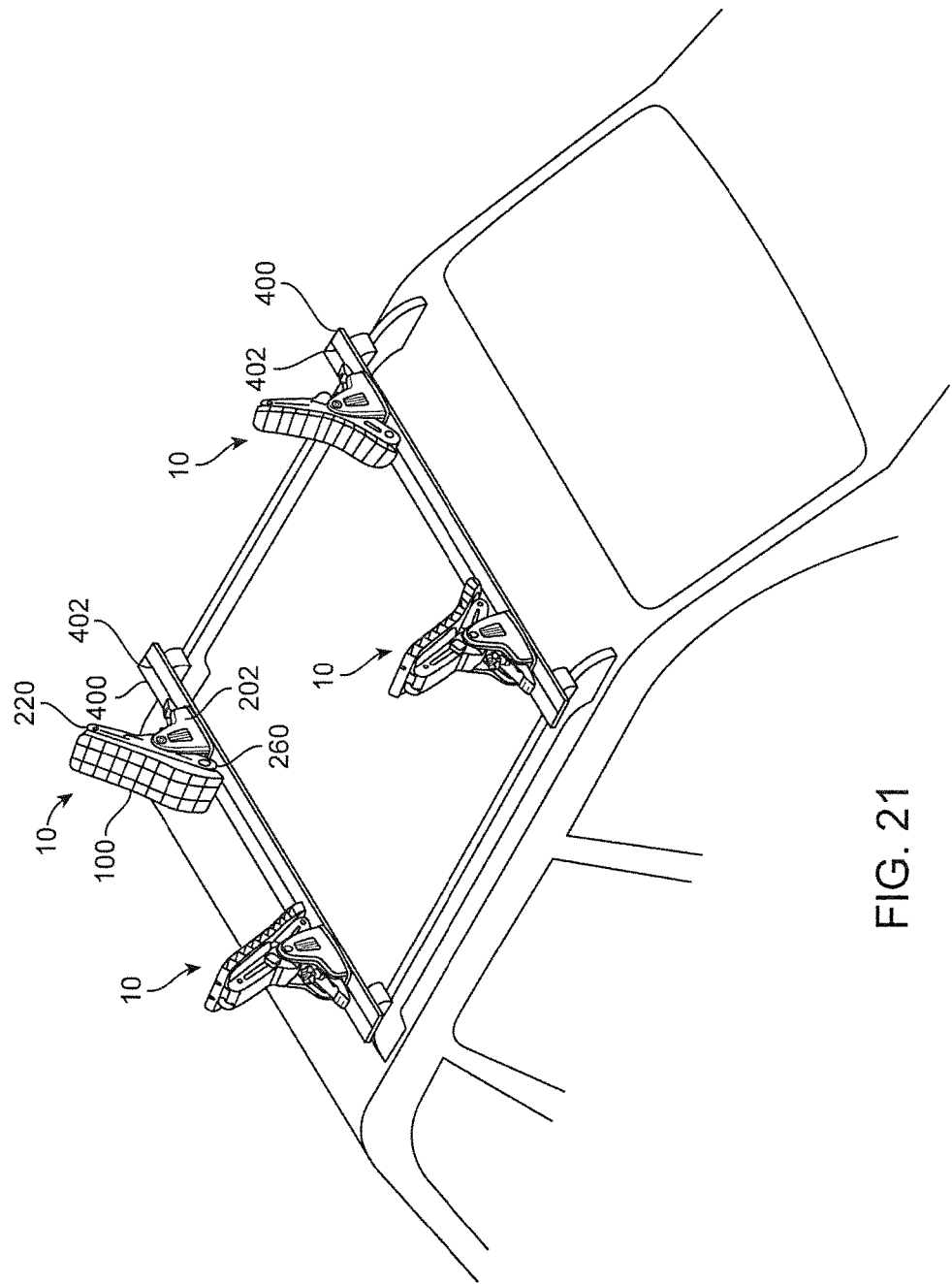
FIG. 21 illustrates adjustable supports disposed on load bars of a vehicle according to an embodiment.

As shown, for example in FIG. 21, multiple adjustable supports 10 can be used in a system to carry a load on the roof of a vehicle. For example, in certain embodiments, two pairs of adjustable supports can form a support system. Two adjustable supports 10 can be coupled to each of two load bars 400. In certain embodiments, a distance between the adjustable supports 10 in a pair can be altered by sliding the adjustable supports 10 along a slot 402 in the load bar 400.

As also shown in FIG. 21, in certain embodiments, the arms 220, 260 of the rear pair of adjustable supports 10 (near the rear of vehicle) can be disposed at different angles and/or in different configurations than the front pair of adjustable supports 10 (near the windshield of vehicle). In certain embodiments, each adjustable support 10 can be disposed at a different angle and/or in a different configuration than the other adjustable supports 10. Generally, the angles of the arms 220, 260 can be fixed prior to loading the equipment onto the vehicle. In one embodiment, the angles may be fixed after loading the equipment.

In certain embodiments, the support pads 100 of one pair of adjustable supports 10 can be made from or covered with a material that reduces friction between the support pad 100 and the equipment being loaded onto the vehicle. For example, in certain embodiments, the rear pair of adjustable supports 10 can have felt disposed on support pads 100, which can allow, for example, a kayak to more easily slide onto the roof of the vehicle when being loaded from the rear of the vehicle. In certain embodiments, the support pads 100 on the front pair of adjustable supports 10 can be made of a material such as rubber or TPE to provide a better gripping surface to support the kayak. As the kayak is loaded on the adjustable supports 10, the arms 220, 260 are free to rotate together about the pivot axis 210.

It is to be appreciated that the Detailed Description section, and not the Brief Summary and Abstract sections, is intended to be used to interpret the claims. The Summary and Abstract sections may set forth one or more but not all exemplary embodiments of support pads and adjustable load supports as contemplated by the inventors, and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A load support for a vehicle load bar, comprising:
a base;
a first arm coupled to the base and rotatable about a pivot axis;
a second arm coupled to the base and rotatable about the pivot axis; and
a pad coupled to the first arm and the second arm and extending from the first arm to the second arm, wherein the pad is configured to receive a load disposed on the load support,
wherein the first arm and the second arm are configured to selectively move relative to each other, and
wherein, in a first configuration, an angle relative to a lengthwise direction of the first arm and a lengthwise direction of the second arm is at least 160 degrees.

2. The load support of claim 1, further comprising a fastener that couples the base, the first arm, and the second arm along the pivot axis.

3. The load support of claim 2, wherein the base comprises a first upright and a second upright, and wherein the pivot axis extends perpendicularly through the first and second uprights.

4. The load support of claim 3, wherein a proximal end of the first arm is disposed exterior to a proximal end of the second arm and the proximal end of the first arm is disposed interior to the first and second uprights.

5. The load support of claim 1, further comprising a locking device coupled with the first arm configured to selectively fix a position of the first arm and the second arm relative to each other in a locked configuration.

6. The load support of claim 5, wherein the first and second arms are configured to lock in a plurality of positions relative to each other.

7. The load support of claim 5, wherein the locking device is configured to engage a notch in the second arm to prevent movement of the first arm and the second arm relative to each other.

8. The load support of claim 7, wherein the locking device is configured to disengage from the notch to allow movement of the first arm and the second arm relative to each other and separately about the pivot axis.

9. The load support of claim 7, wherein the second arm comprises a plurality of notches, wherein the first arm is disposed at a first angle relative to the second arm when the locking device is disposed in a first notch, and wherein the first arm is disposed at a second angle relative to the second arm when the locking device is disposed in a second notch.

10. The load support of claim 8, further comprising a third notch and a fourth notch in the second arm, wherein when the locking device is disposed in the first notch, the second notch, the third notch, and the fourth notch, an angle between the first arm and the second arm is approximately 180 degrees, 160 degrees, 140 degrees, and 120 degrees, respectively.

11. The load support of claim 5, wherein the locking device includes a spring biasing the locking device into the locked configuration.

12. The load support of claim 5, wherein the first arm and the second arm rotate simultaneously about the pivot axis in the locked configuration.

13. The load support of claim 1, wherein the base includes a first stopping surface configured to limit rotation of the first arm in a first direction.

14. The load support of claim 13, wherein an angle between the first arm and a bottom of the base is approximately 90 degrees when the first arm contacts the first stopping surface.

15. The load support of claim 13, wherein the base includes a second stopping surface configured to limit rotation of the second arm in a second direction.

16. The load support of claim 15, wherein an angle between the second arm and a bottom of the base is approximately 45 degrees when the second arm contacts the second stopping surface.

17. The load support of claim 1, wherein a length of the first arm is longer than a length of the second arm.

18. An assembly for supporting a load on a vehicle load bar, the assembly comprising:
a first base configured to couple to the load bar, the first base comprising:
a first pair of arms coupled to the first base by a first fastener disposed along a first pivot axis, wherein the first pair of arms are configured to rotate about the first pivot axis, and
a first locking device configured to prevent movement of the first pair of arms relative to each other in a locked configuration and configured to allow movement of the first pair of arms relative to each other in an unlocked configuration,
wherein, in a first configuration, an angle between the first pair of arms is approximately 180 degrees; and
a second base configured to couple to the load bar and having a load support surface facing a load support surface of the first base, the second base comprising:
a second pair of arms coupled to the second base by a second fastener disposed along a second pivot axis, wherein the second pair of arms are configured to rotate about the second pivot axis, and
a second locking device configured to prevent movement of the second pair of arms relative to each other in a locked configuration and configured to allow movement of the second pair of arms relative to each other in an unlocked configuration.

19. The assembly of claim 18, further comprising a slide lock disposed in a first arm of the first pair of arms, the slide lock having a plate configured to engage a notch in a second arm of the first pair of arms to prevent movement of the first arm and the second arm relative to each other, and wherein the slide lock is configured to disengage from the notch to allow movement of the first arm and the second arm relative to each other.

20. The assembly of claim 19, wherein the second arm comprises a plurality of notches, wherein the first arm is disposed at a first angle relative to the second arm when the slide lock is disposed in a first notch, and wherein the first arm is disposed at a second angle relative to the second arm when the slide lock is disposed in a second notch.

21. The assembly of claim 20, further comprising a third notch and a fourth notch in the second arm, wherein when the slide lock is disposed in the first notch, the second notch, the third notch, and the fourth notch, an angle between the first arm and the second arm is approximately 180 degrees, 150 degrees, 120 degrees, and 90 degrees, respectively.

22. A support for reducing pressure imparted to a load carried on a vehicle, the support comprising:
a base;
two independent arms coupled to the base at the same pivot axis,
wherein the arms are configured to rotate about the pivot axis and are movable relative to each other from a first locked position to a second locked position, and
wherein an angle between the arms is smaller in the second position than in the first position;
a pad coupled to the arms and extending between the two independent arms; and
a locking device configured to lock the arms in the first locked position and the second locked position and configured to disengage to allow the arms to move from the first locked position to the second locked position,
wherein, in the first locked position or the second locked position, the two independent arms are locked relative to each other and configured to rotate together about the pivot axis.

23. The load support of claim 1, further comprising:
a second base;
a third arm coupled to the second base and rotatable about a second pivot axis;
a fourth arm coupled to the second base and rotatable about the second pivot axis; and
a second pad coupled to the third arm and the fourth arm, wherein the second pad is configured to receive the load disposed on the load support, and
wherein the third arm and the fourth arm are configured to selectively move relative to each other.

24. The load support of claim 1, wherein the pad comprises a first attachment element and a second attachment element.

25. The load support of claim 24, wherein the first attachment element comprises a slot and the second attachment element comprises a tube.

26. The load support of claim 24, wherein the first attachment element is disposed at a first end of the pad and the second attachment element is disposed at a second end of the pad.

27. The load support of claim 24, wherein the first and second attachment elements are disposed on a rear side of the pad.

28. The load support of claim 1, wherein the first arm comprises a first backing element and the second arm comprises a second backing element, and wherein the pad contacts the first and second backing elements.

29. The assembly of claim 18, wherein the first base and the second base are configured to support the load.

30. The assembly of claim 18, wherein, in a first configuration, an angle between the second pair of arms is approximately 180 degrees.

31. The load support of claim 1, wherein, in the first configuration, the angle relative to the lengthwise direction of the first arm and the lengthwise direction of the second arm is approximately 180 degrees.

\* \* \* \* \*